(12) United States Patent
Nakao et al.

(10) Patent No.: US 8,369,382 B2
(45) Date of Patent: Feb. 5, 2013

(54) RADIO COMMUNICATION DEVICE AND CONSTELLATION CONTROL METHOD

(75) Inventors: Seigo Nakao, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/525,109

(22) Filed: Jun. 15, 2012

(65) Prior Publication Data

US 2012/0250652 A1 Oct. 4, 2012

Related U.S. Application Data

(63) Continuation of application No. 12/740,509, filed as application No. PCT/JP2008/003068 on Oct. 28, 2008, now Pat. No. 8,259,781.

(30) Foreign Application Priority Data

Oct. 29, 2007 (JP) .................................. 2007-280795

(51) Int. Cl.
*H04B 1/00* (2006.01)
(52) U.S. Cl. ........................................ 375/146; 375/130
(58) Field of Classification Search .................. 375/146, 375/130
See application file for complete search history.

(56) References Cited

U.S. PATENT DOCUMENTS

| | | | |
|---|---|---|---|
| 6,282,228 B1 | 8/2001 | Monroe | |
| 6,791,995 B1 | 9/2004 | Azenkot et al. | |
| 7,050,419 B2 | 5/2006 | Azenkot et al. | |
| 7,852,883 B2 * | 12/2010 | Kwak et al. | ................... 370/522 |
| 8,155,100 B2 * | 4/2012 | Papasakellariou et al. | ... 370/344 |
| 2003/0072286 A1 | 4/2003 | Kim et al. | |
| 2003/0223354 A1 | 12/2003 | Olszewski | |
| 2004/0032838 A1 | 2/2004 | Min | |
| 2006/0203935 A1 | 9/2006 | Li et al. | |
| 2007/0242764 A1 | 10/2007 | Anigstein et al. | |
| 2009/0092148 A1 * | 4/2009 | Zhang et al. | ................... 370/458 |
| 2009/0232062 A1 | 9/2009 | Higuchi et al. | |
| 2010/0232388 A1 | 9/2010 | Nakao et al. | |

FOREIGN PATENT DOCUMENTS

| | | |
|---|---|---|
| EP | 0 982 892 A2 | 3/2000 |
| JP | 2005-27336 A | 1/2005 |
| WO | 2008/093774 A1 | 8/2008 |
| WO | 2009/057284 A1 | 5/2009 |

OTHER PUBLICATIONS

"3rd Generation Partnership Project; Technical Specification Group Radio Access Network; Evolved Universal Terrestrial Radio Access (E-UTRA): Physical Channels and Modulation (Release 8)," 3rd Generation Partnership Project (3GPP™) TS 36.211 V8.0.0., Sep. 2007, pp. 1-49.

Extended European Search Report, for corresponding European Application No. 08845779.1, dated Jun. 16, 2011, 7 pages.

(Continued)

*Primary Examiner* — Juan A Torres
(74) *Attorney, Agent, or Firm* — Seed IP Law Group PLLC

(57) ABSTRACT

A base station is provided for receiving an acknowledgement or negative acknowledgement (ACK/NACK) signal, including a transmitting unit configured to transmit a control signal using one or a plurality of control channel elements (CCE(s)). The base station also includes a receiving unit configured to receive an ACK/NACK signal, the ACK/NACK signal being multiplied by an orthogonal sequence, by a sequence defined by a cyclic shift, and by either a first value or a second value, wherein the first value rotates a constellation of the ACK/NACK signal by 0 degrees and the second value rotates the constellation of the ACK/NACK signal by N degrees, which is different from 0 degrees.

6 Claims, 13 Drawing Sheets

OTHER PUBLICATIONS

Extended European Search Report, for corresponding European Application No. 12150294.2, dated Feb. 27, 2012, 9 pages.

International Search Report, mailed Feb. 3, 2009, issued in corresponding International Application No. PCT/JP2008/003068, filed Oct. 28, 2008.

LG Electronics, "Enhanced bit-level operation for H-ARQ in uplink multi-user MIMO," R1-071120, TSG-RAN WG1 #48, St. Louis, USA, Feb. 12-16, 2007, 6 pages.

LG Electronics, "Restriction of UL/DL subframe ratio considering PUCCH in TDD," R1-074196, Agenda Item: 6.2.3, 3GPP TSG RAN WG1 #50bis, Shanghai, China, Oct. 8-12, 2007, 10 pages.

Nakao et al., "Considerations on the Scrambling for Evolved UTRA Uplink Control Channel," IEICE Technical Report 108(249):55-60, RCS2008-112, Oct. 15, 2008.

Nakao et al., "Performance Improvement of Evolved UTRA Uplink Control Channel for Fast Fading," IEICE Technical Report 108(188):49-54, RCS2008-61, Aug. 20, 2008.

Nokia Siemens Networks, Nokia, "Multiplexing Capability of CQIs and ACK/NACKs Form Different UEs," Report R1-072315, 3rd Generation Partnership Project (3GPP™) TSG RAN WG1 Meeting #49, Kobe, Japan, May 7-11, 2007, 4 pages.

Nokia Siemens Networks, Nokia, "Multiplexing of Scheduling Request and ACK/NACK and/or CQI," R1-073011, Agenda Item: 5.13.2, 3GPP TSG RAN WG1 #49bis, Orlando, USA, Jun. 25-29, 2007, 4 pages.

Notice of the Reasons for Rejection, for corresponding Japanese Application No. 2011-273382, dated Jan. 24, 2012, 3 pages.

NTT DoCoMo, Fujitsu, Mitsubishi Electric, "Implicit Resource Allocation of ACK/NACK Signal in E-UTRA Uplink," Report R1-072439, 3rd Generation Partnership Project (3GPP™) TSG RAN WG1 Meeting #49, Kobe, Japan, May 7-11, 2007, pp. 1-3.

Panasonic, NTT DoCoMo, "Necessity of the Scrambling for the Reference Signal of CQI in PUCCH," Report R1-080979, 3rd Generation Partnership Project (3GPP™) TSG RAN WG1 Meeting #52, Sorrento, Italy, Feb. 11-15, 2008, pp. 1-5.

Panasonic, NTT DoCoMo, "Necessity of the Scrambling for AKC/NACK on PUCCH," Report R1-080978, 3rd Generation Partnership Project (3GPP™) TSG RAN WG1 Meeting #52, Sorrento, Italy, Feb. 11-15, 2008, pp. 1-6.

Panasonic, "Signaling Parameters for UL ACK/NACK Resources," Report R1-073616, 3rd Generation Partnership Project (3GPP™) TSG RAN WG1 Meeting #50, Athens, Greece, Aug. 20-24, 2007, pp. 1-3.

Panasonic, "Variable Phase Definition of the Reference Signal for CQI in PUCCH," Report R1-073621, 3rd Generation Partnership Project (3GPP™) TSG RAN WG1 Meeting #50, Athens, Greece, Aug. 20-24, 2007, pp. 1-5.

Samsung, "Implicit mapping of CCE to UL ACK/NACK resource," R1-073122, Agenda Item: 5.13.2, 3GPP RAN WG1 Meeting #49bis, Orlando, USA, Jun. 25-29, 2007, 4 pages.

Samsung, "Cyclic Shift Hopping of UL ACK Channels," R1-073149, 3rd Generation Partnership Project (3GPP™) TSG RAN WG1 Meeting #49bis, Orlando, USA, Jun. 25-29, 2007, pp. 1-6.

* cited by examiner

FIG.1  *Prior Art*

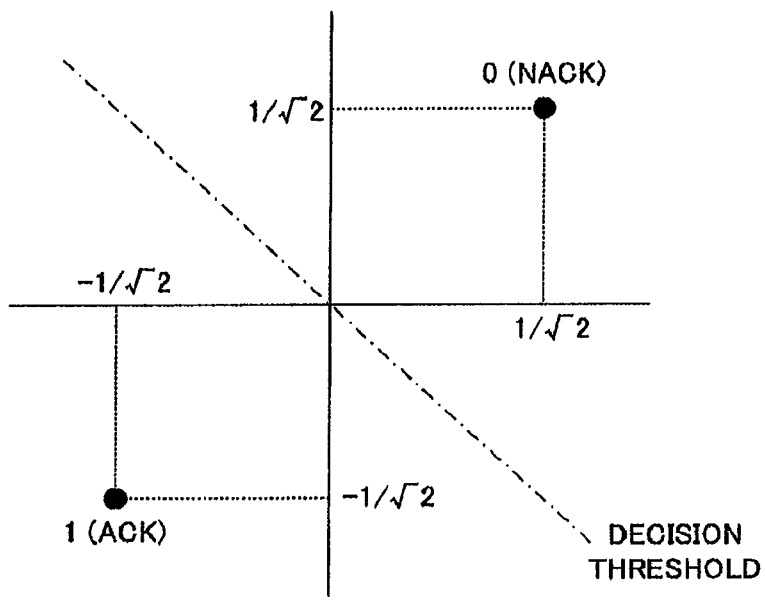
FIG.3  *Prior Art*
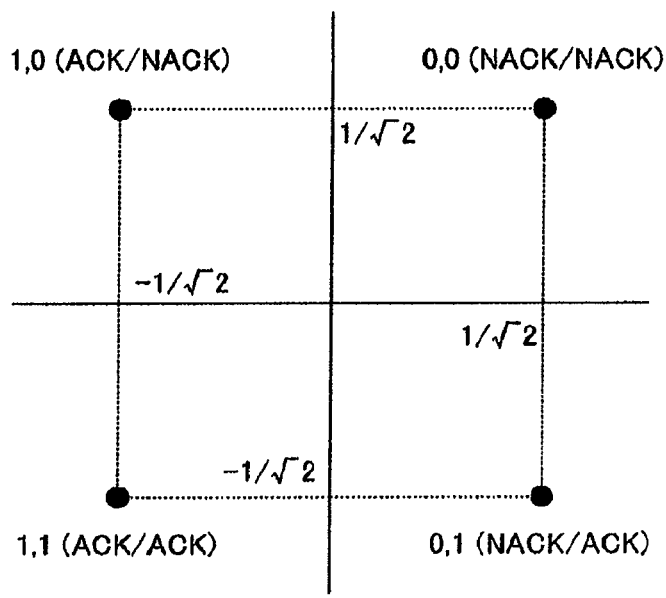
FIG.4  *Prior Art*

RADIO COMMUNICATION DEVICE AND CONSTELLATION CONTROL METHOD

TECHNICAL FIELD

The present invention relates to a radio communication apparatus and constellation control method.

DESCRIPTION OF THE RELATED ART

In mobile communication, ARQ (Automatic Repeat Request) is applied to downlink data from a radio communication base station apparatus (hereinafter abbreviated to "base station") to radio communication mobile station apparatuses (hereinafter abbreviated to "mobile stations"). That is, mobile stations feed back response signals representing error detection results of downlink data, to the base station. Mobile stations perform a CRC (Cyclic Redundancy Check) check of downlink data, and, if CRC=OK is found (i.e., if no error is found), feed back an ACK (ACKnowledgement), and, if CRC=NG is found (i.e., if error is found), feed back a NACK (Negative ACKnowledgement), as a response signal to the base station. These response signals are transmitted to the base station using uplink control channels such as a PUCCH (Physical Uplink Control CHannel).

Also, the base station transmits control information for carrying resource allocation results of downlink data, to mobile stations. This control information is transmitted to the mobile stations using downlink control channels such as L1/L2 CCH's (L1/L2 Control CHannels). Each L1/L2 CCH occupies one or a plurality of CCE's (Control Channel Elements) based on the coding rate of control information. For example, when an L1/L2 CCH for carrying control information coded by a rate of 2/3 occupies one CCE, an L1/L2 CCH for carrying control information coded by a rate of 1/3 occupies two CCE's, an L1/L2 CCH for carrying control information coded by a rate of 1/6 occupies four CCE's and an L1/L2 CCH for carrying control information coded by a rate of 1/12 occupies eight CCE's. Also, when one L1/L2 occupies a plurality of CCE's, the CCE's occupied by that one L1/L2 CCH are consecutive. The base station generates an L1/L2 CCH on a per mobile station basis, assigns CCE's to be occupied by L1/L2 CCH's based on the number of CCE's required by control information, and maps the control information on physical resources corresponding to the assigned CCE's and transmits the control information.

Also, studies are underway to map between CCE's and PUCCH's on a one-to-one basis, to use downlink communication resources efficiently without signaling from a base station to mobile stations for reporting the PUCCH's to be used for transmission of response signals (see Non-Patent Document 1). According to this mapping, each mobile station can decide the PUCCH to use to transmit response signals from the mobile station, from the CCE's corresponding to physical resources on which control information for the mobile station is mapped. Therefore, each mobile station maps a response signal from the mobile station on a physical resource, based on the CCE corresponding to a physical resource on which control information directed to the mobile station is mapped. For example, when a CCE corresponding to a physical resource on which control information directed to the mobile station is mapped, is CCE #0, the mobile station decides PUCCH #0 associated with CCE #0 as the PUCCH for the mobile station. Also, for example, when CCE's corresponding to physical resources on which control information directed to the mobile station is mapped are CCE #0 to CCE #3, the mobile station decides PUCCH #0 associated with CCE #0, which is the smallest number in CCE #0 to CCE #3, as the PUCCH for the mobile station, and, when CCE's corresponding to physical resources on which control information directed to the mobile station is mapped are CCE #4 to CCE #7, the mobile station decides PUCCH #4 associated with CCE #4, which is the smallest number in CCE #4 to CCE #7, as the PUCCH for the mobile station.

Also, as shown in FIG. 1, studies are underway to perform code-multiplexing by spreading a plurality of response signals from a plurality of mobile stations using ZAC (Zero Auto Correlation) sequences and Walsh sequences (see Non-Patent Document 2). In FIG. 1, $[W_0, W_1, W_2, W_3]$ represents a Walsh sequence with a sequence length of 4. As shown in FIG. 1, in a mobile station, first, a response signal of ACK or NACK is subject to first spreading by a ZAC sequence (with a sequence length of 12) in the frequency domain. Next, the response signal subjected to first spreading is subject to an IFFT (Inverse Fast Fourier Transform) in association with $W_0$ to $W_3$. The response signal spread in the frequency domain by a ZAC sequence with a sequence length of 12 is transformed to a ZAC sequence with a sequence length of 12 in the time domain by this IFFT. Then, the signal subjected to the IFFT is subject to second spreading using a Walsh sequence (with a sequence length of 4). That is, one response signal is allocated to each of four SC-FDMA (Single Carrier-Frequency Division Multiple Access) symbols $S_0$ to $S_3$. Similarly, response signals of other mobile stations are spread using ZAC sequences and Walsh sequences. Here, different mobile stations use ZAC sequences of different cyclic shift values in the time domain (i.e., in the cyclic shift axis) or different Walsh sequences. Here, the sequence length of ZAC sequences in the time domain is 12, so that it is possible to use twelve ZAC sequences of cyclic shift values "0" to "11," generated from the same ZAC sequence. Also, the sequence length of Walsh sequences is 4, so that it is possible to use four different Walsh sequences. Therefore, in an ideal communication environment, it is possible to code-multiplex maximum forty-eight (12×4) response signals from mobile stations.

Also, as shown in FIG. 1, studies are underway to code-multiplex a plurality of reference signals (e.g., pilot signals) from a plurality of mobile stations (see Non-Patent Document 2). As shown in FIG. 1, in the case of generating three symbols of reference signals $R_0$, $R_1$ and $R_2$, similar to the case of response signals, first, the reference signals are subject to first spreading in the frequency domain by a sequence having characteristics of a ZAC sequence (with a sequence length of 12) in the time domain. Next, the reference signals subjected to first spreading are subject to an IFFT in association with orthogonal sequences with a sequence length of 3, $[F_0, F_1, F_2]$, such as a Fourier sequence. The reference signals spread in the frequency domain are converted by this IFFT to ZAC sequences with a sequence length of 12 in the time domain. Further, these signals subjected to IFFT are subject to second spreading using orthogonal sequences $[F_0, F_1, F_2]$. That is, one reference signal is allocated to three SC-FDMA symbols $R_0$, $R_1$ and $R_2$. Similarly, other mobile stations allocate one reference signal to three symbols $R_0$, $R_1$ and $R_2$. Here, different mobile stations use ZAC sequences of different cyclic shift values in the time domain or different orthogonal sequences. Here, the sequence length of ZAC sequences in the time domain is 12, so that it is possible to use twelve ZAC sequences of cyclic shift values "0" to "11," generated from the same ZAC sequence. Also, the sequence length of an orthogonal sequence is 3, so that it is possible to use three different orthogonal sequences. Therefore, in an ideal communication environment, it is possible to code-multiplex maximum thirty-six (12×3) reference signals from mobile stations.

As shown in FIG. 1, seven symbols of $S_0$, $S_1$, $R_0$, $R_1$, $R_2$, $S_2$ and $S_3$ form one slot.

Here, there is substantially no cross correlation between ZAC sequences of different cyclic shift values generated from the same ZAC sequence. Therefore, in an ideal communication environment, a plurality of response signals subjected to spreading and code-multiplexing by ZAC sequences of different cyclic shift values (0 to 11), can be separated in the time domain substantially without inter-code interference, by correlation processing in the base station.

However, due to an influence of, for example, transmission timing difference in mobile stations and multipath delayed waves, a plurality of response signals from a plurality of mobile stations do not always arrive at a base station at the same time. For example, if the transmission timing of a response signal spread by the ZAC sequence of cyclic shift value "0" is delayed from the correct transmission timing, the correlation peak of the ZAC sequence of cyclic shift value "0" may appear in the detection window for the ZAC sequence of cyclic shift value "1." Further, if a response signal spread by the ZAC sequence of cyclic shift value "0" has a delay wave, an interference leakage due to the delayed wave may appear in the detection window for the ZAC sequence of cyclic shift value "1." That is, in these cases, the ZAC sequence of cyclic shift value "1" is interfered with by the ZAC sequence of cyclic shift value "0." On the other hand, if the transmission timing of a response signal spread by the ZAC sequence of cyclic shift value "1" is earlier than the correct transmission timing, the correlation peak of the ZAC sequence of cyclic shift value "1" may appear in the detection window for the ZAC sequence of cyclic shift value "0." That is, in this case, the ZAC sequence of cyclic shift value "0" is interfered with by the ZAC sequence of cyclic shift value "1." Therefore, in these cases, the separation performance degrades between a response signal spread by the ZAC sequence of cyclic shift value "0" and a response signal spread by the ZAC sequence of cyclic shift value "1." That is, if ZAC sequences of adjacent cyclic shift values are used, the separation performance of response signals may degrade.

Therefore, up until now, if a plurality of response signals are code-multiplexed by spreading with ZAC sequences, a sufficient cyclic shift value difference (i.e., cyclic shift interval) is provided between the ZAC sequences, such that inter-code interference is not caused between the ZAC sequences. For example, when the difference between cyclic shift values of ZAC sequences is 2, only six ZAC sequences of cyclic shift values "0," "2," "4," "6," "8" and "10" or cyclic shift values "1," "3," "5," "7," "9" and "11" amongst twelve ZAC sequences of cyclic shift values "0" to "12," are used in first spreading of response signals. Therefore, if a Walsh sequence with a sequence length of 4 is used in second spreading of response signals, it is possible to code-multiplex maximum twenty-four (6×4) response signals from mobile stations.

However, as shown in FIG. 1, the sequence length of an orthogonal sequence used to spread reference signals is 3, and therefore only three different orthogonal sequences can be used to spread reference signals. Consequently, when a plurality of response signals are separated using the reference signals shown in FIG. 1, only maximum eighteen (6×3) response signals from mobile stations can be code-multiplexed. That is, three Walsh sequences are required amongst four Walsh sequences with a sequence length of 4, and therefore one Walsh sequence is not used.

Also, the 1 SC-FDMA symbol shown in FIG. 1 may be referred to as "1 LB (Long Block)." Therefore, a spreading code sequence that is used in spreading in symbol units or LB units, is referred to as a "block-wise spreading code sequence."

Also, studies are underway to define eighteen PUCCH's as shown in FIG. 2. Normally, the orthogonality of response signals does not collapse between mobile stations using different block-wise spreading code sequences, as long as the mobile stations do not move fast. But, especially if there is a large difference of received power between response signals from a plurality of mobile stations at a base station, one response signal may be interfered with by another response signal between mobile stations using the same block-wise spreading code sequence. For example, in FIG. 2, a response signal using PUCCH #1 (cyclic shift value=2) may be interfered with by a response signal using PUCCH #0 (cyclic shift value=0).

Also, studies are underway to use the constellation shown in FIG. 3 when BPSK is used as the modulation scheme for response signals, and the constellation shown in FIG. 4 when QPSK is used as the modulation scheme for response signals (see Non-Patent Document 3).

Non-Patent Document 1: NTT DoCoMo, Fujitsu, Mitsubishi Electric, "Implicit Resource Allocation of ACK/NACK Signal in E-UTRA Uplink," Report R1-072439, 3GPP TSG RAN WG1 Meeting #49, Kobe, Japan, May 7-11, 2007.

Non-Patent Document 2: Nokia Siemens Networks, Nokia, "Multiplexing capability of CQIs and ACK/NACKs form different UEs," Report R1-72315, 3GPP TSG RAN WG1 Meeting #49, Kobe, Japan, May 7-11, 2007.

Non-Patent Document 3: 3GPP TS 36.211 V8.0.0, "Physical Channels and Modulation (Release 8)," September 2007.

DISCLOSURE OF INVENTION

Problems to be Solved by the Invention

An example case will be described below where the constellation shown in FIG. 3 is used to modulate a response signal. Also, an example case will be described below where one mobile station #1 transmits a response signal using PUCCH #1 (in FIG. 2) and another mobile station #2 transmits a response signal using PUCCH #0 (in FIG. 2), In this case, the base station performs the above-described correlation processing to distinguish between the response signal from mobile station #1 and the response signal from mobile station #2. At this time, components of the response signal from mobile station #2 may leak in the correlation output to receive the response signal of mobile station #1, and interfere with the response signal of mobile station #1.

Then, when mobile station #1 and mobile station #2 both transmit an ACK and the base station receives the response signal from mobile station #1, interference given from the response signal of mobile station #2 to the response signal of mobile station #1 is as follows.

That is, when the ACK and reference signal transmitted from mobile station #1 are received by the base station via a channel, in the base station, a response signal represented by $(-1-j)h1/\sqrt{2}$ and a reference signal represented by $(1+j)h1/\sqrt{2}$ are found as a correlation output of mobile station #1. Here, h1 is an effective channel in a case where the signals from mobile station #1 pass a channel between mobile station #1 and the base station, and are found, as a correlation output, in the detection window for mobile station #1 in the base station.

Also, when the ACK and reference signal transmitted from mobile station #2 are received by the base station via a channel, in the base station, the component represented by (−1−j)h2/√2 is found as interference to the response signal of mobile station #1 and the component represented by (1+j)h2/√2 is found as interference to the reference signal of mobile station #1 in the correlation output of mobile station #1. Here, h2 is an effective channel in a case where the signals from mobile station #2 pass the channel between mobile station #2 and the base station, and leak, as the correlation output, in the detection window for mobile station #1 in the base station.

When there is little delay on a channel and no transmission timing difference at a mobile station, such a leak does not occur. But, depending on conditions, h2 may be non-negligibly high for h1. Therefore, when an ACK from mobile station #1 and an ACK from mobile station #2 are code-multiplexed, in the base station, a response signal represented by (−1−j)(h1+h2)/√2 and a reference signal represented by (1+j)(h1+h2)/√2 are found in the correlation output of mobile station #1.

Therefore, the interference component given from the ACK of mobile station #2 to the ACK of mobile station #1 (i.e., the Euclidean distance from (−1−j)/√2) by the synchronous detection in the base station, is represented by equation 1. That is, when both mobile station #1 and mobile station #2 transmit an ACK, there is no inter-code interference between the ACK of mobile station #1 and the ACK of mobile station #2.

$$\frac{(1+j)}{\sqrt{2}}\left(-1 - \frac{-h_1 - h_2}{h_1 + h_2}\right) = 0 \quad \text{(Equation 1)}$$

Also, when mobile station #1 transmits a NACK, mobile station #2 transmits an ACK and the base station receives the response signal from mobile station #1, interference from the response signal of mobile station #2 to the response signal #1 is as follows.

That is, when the NACK and reference signal transmitted from mobile station #1 are received by the base station via a channel, in the base station, a response signal represented by (1+j)h1/√2 and a reference signal represented by (1+j)h1/√2 are found as a correlation output of mobile station #1.

Also, when the ACK and reference signal transmitted from mobile station #2 are received by the base station via a channel, in the base station, the component represented by (−1−j)h2/√2 is found as interference to the response signal of mobile station #1 and the component represented by (1+j)h2/√2 is found as interference to the reference signal of mobile station #1 in the correlation output of mobile station #1.

Therefore, when the NACK from mobile station #1 and the ACK from mobile station #2 are code-multiplexed, in the base station, a response signal represented by (1+j)(h1−h2)/√2 and a reference signal represented by (1+j)(h1+h2)/√2 are found in the correlation output of mobile station #1.

Therefore, the interference component given from the ACK of mobile station #2 to the NACK of mobile station #1 (i.e., the Euclidean distance from (1+j)/√2) by the synchronous detection in the base station, is represented by equation 2. That is, when mobile station #1 transmits a NACK and mobile station #2 transmits an ACK, significant inter-code interference may be given from the ACK of mobile station #2 to the NACK of mobile station #1.

$$\frac{(1+j)}{\sqrt{2}}\left(1 - \frac{h_1 - h_2}{h_1 + h_2}\right) = \frac{(1+j)}{\sqrt{2}}\left(\frac{2h_2}{h_1 + h_2}\right) \quad \text{(Equation 2)}$$

Similarly, when mobile station #1 and mobile station #2 both transmit a NACK signal, as shown in equation 3, inter-code interference does not occur between the NACK of mobile station #1 and the NACK of mobile station #2. Also, when mobile station #1 transmits an ACK and mobile station #2 transmits a NACK, as shown in equation 4, significant inter-code interference may be given from the NACK of mobile station #2 to the ACK of mobile station #1.

$$\frac{(1+j)}{\sqrt{2}}\left(1 - \frac{h_1 + h_2}{h_1 + h_2}\right) = 0 \quad \text{(Equation 3)}$$

$$\frac{(1+j)}{\sqrt{2}}\left(-1 - \frac{-h_1 - h_2}{h_1 + h_2}\right) = \frac{(1+j)}{\sqrt{2}}\left(\frac{-2h_2}{h_1 + h_2}\right) \quad \text{(Equation 4)}$$

Here, while unnecessary retransmission of downlink data is performed in the case where the base station receives an ACK from a mobile station as a NACK by mistake, necessary retransmission of downlink data is not performed in the case where the base station receives a NACK from a mobile station as an ACK by mistake. That is, in the latter case, the mobile station needs to wait for retransmission control in a higher layer than the base station to acquire desired downlink data, and, as a result, downlink data transmission is delayed significantly. Taking into account these results caused by reception error of response signals, 3GPP-LTE defines the target ACK error rate to be approximately 1%, while defining the target NACK error rate to be approximately 0.01%. That is, there is a demand to decrease the NACK error rate sufficiently.

Here, taking into account that ARQ is applied to downlink data, 3GPP-LTE defines approximately 1 to 10% of the target error rate per downlink data transmission. That is, in ARQ of downlink data, the ACK occurrence rate is significantly higher than the NACK occurrence rate. For example, in a mobile communication system in which the target error rate per downlink data transmission is set to 10%, the ACK occurrence rate is 90%, while the NACK occurrence rate is 10%. Therefore, in the above example, there is a high possibility that a response signal of mobile station #2 that interferes with a response signal of mobile station #1 is an ACK. That is, there is a high possibility that, when mobile station #1 transmits a NACK, significant inter-code interference (represented by equation 2) is given from a response signal of mobile station #2 to this NACK, while there is a low possibility that, when mobile station #1 transmits an ACK, significant inter-code interference (represented by equation 4) is given from a response signal of mobile station #2 to this ACK. That is, there is a possibility that a NACK is more influenced by interference than an ACK. Consequently, the possibility of an increased error rate by interference becomes larger in a NACK than an ACK.

Therefore, there is a strong demand for a technique of preventing an increased NACK error rate due to inter-code interference from an ACK and improving the error rate performance of a NACK compared to the prior art, in the case where a plurality of response signals from a plurality of mobile stations are code-multiplexed.

It is therefore an object of the present invention to provide a radio communication apparatus and constellation control method for improving the error rate performance compared to the prior art.

Means for Solving the Problem

The radio communication apparatus of the present invention employs a configuration having: a first spreading section that performs first spreading of a response signal using one of a plurality of first sequences that can be separated from each other because of different cyclic shift values; a second spreading section that performs second spreading of the response signal subjected to the first spreading using one of a plurality of second sequences that are orthogonal to each other; and an inverting section that, with reference to a first constellation of a first response signal group formed with response signals subject to the first spreading by a part of the plurality of first sequences, inverts a second constellation of a second response signal group formed with response signals subject to the first spreading by other first sequences than the part of the plurality of first sequences.

The constellation control method of the present invention includes: a first spreading step of performing first spreading of a response signal using one of a plurality of first sequences that can be separated from each other because of different cyclic shift values; a second spreading step of performing second spreading of the response signal subjected to the first spreading using one of a plurality of second sequences that are orthogonal to each other; and an inverting step of, with reference to a first constellation of a first response signal group formed with response signals subject to the first spreading by a part of the plurality of first sequences, inverting a second constellation of a second response signal group formed with response signals subject to the first spreading by other first sequences than the part of the plurality of first sequences.

Advantageous Effect of Invention

According to the present invention, it is possible to improve the error rate performance of a NACK compared to the prior art.

BRIEF DESCRIPTION OF DRAWINGS

FIG. 3 illustrates a BPSK constellation (prior art);
FIG. 4 illustrates a QPSK constellation (prior art)

BEST MODE OF EMBODIMENTS OF THE INVENTION

Embodiments of the present invention will be explained below in detail with reference to the accompanying drawings.

Embodiment 1

Figure 5:
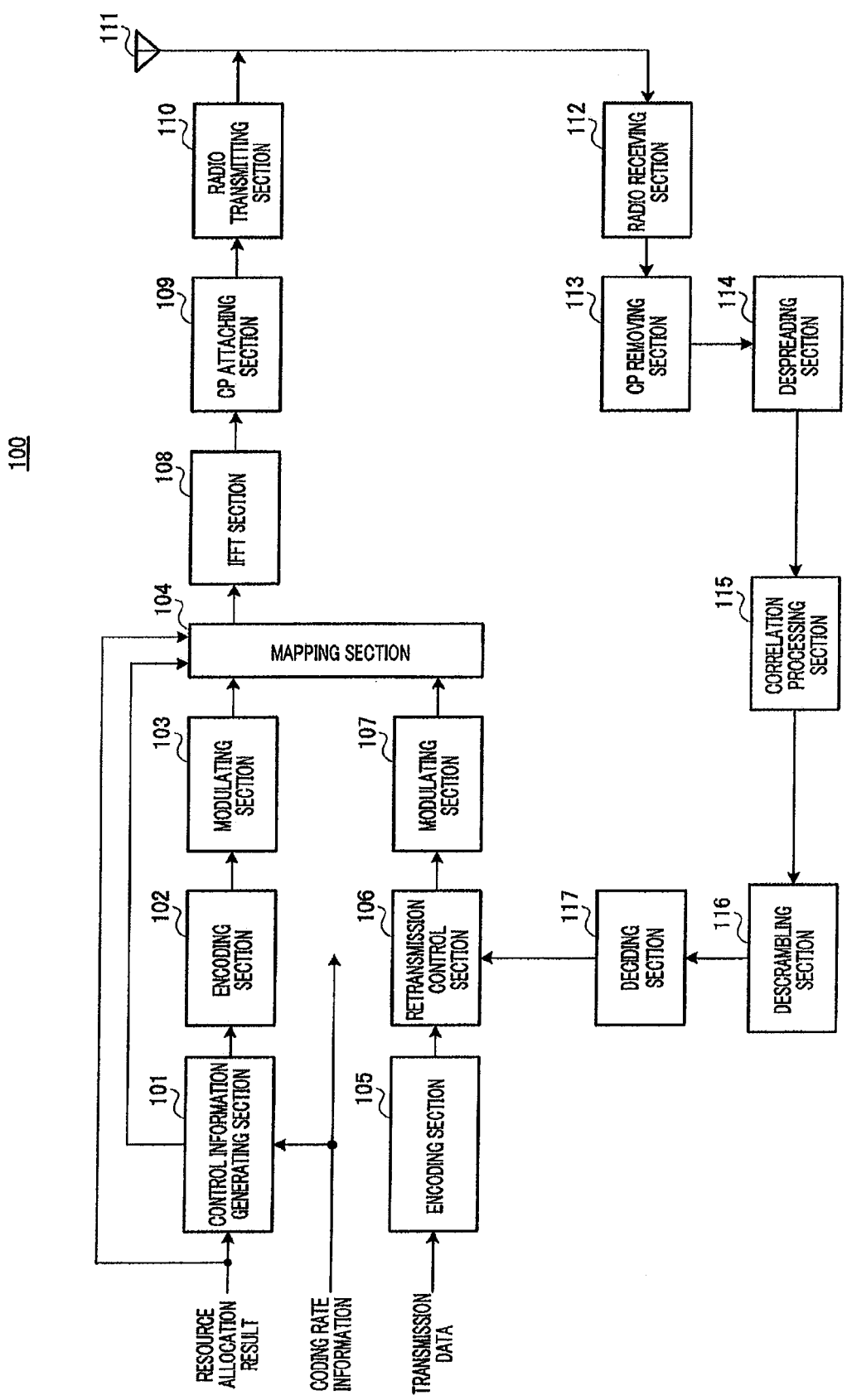
FIG. 5 is a block diagram showing the configuration of a base station according to Embodiment 1 of the present invention.
Figure 6:
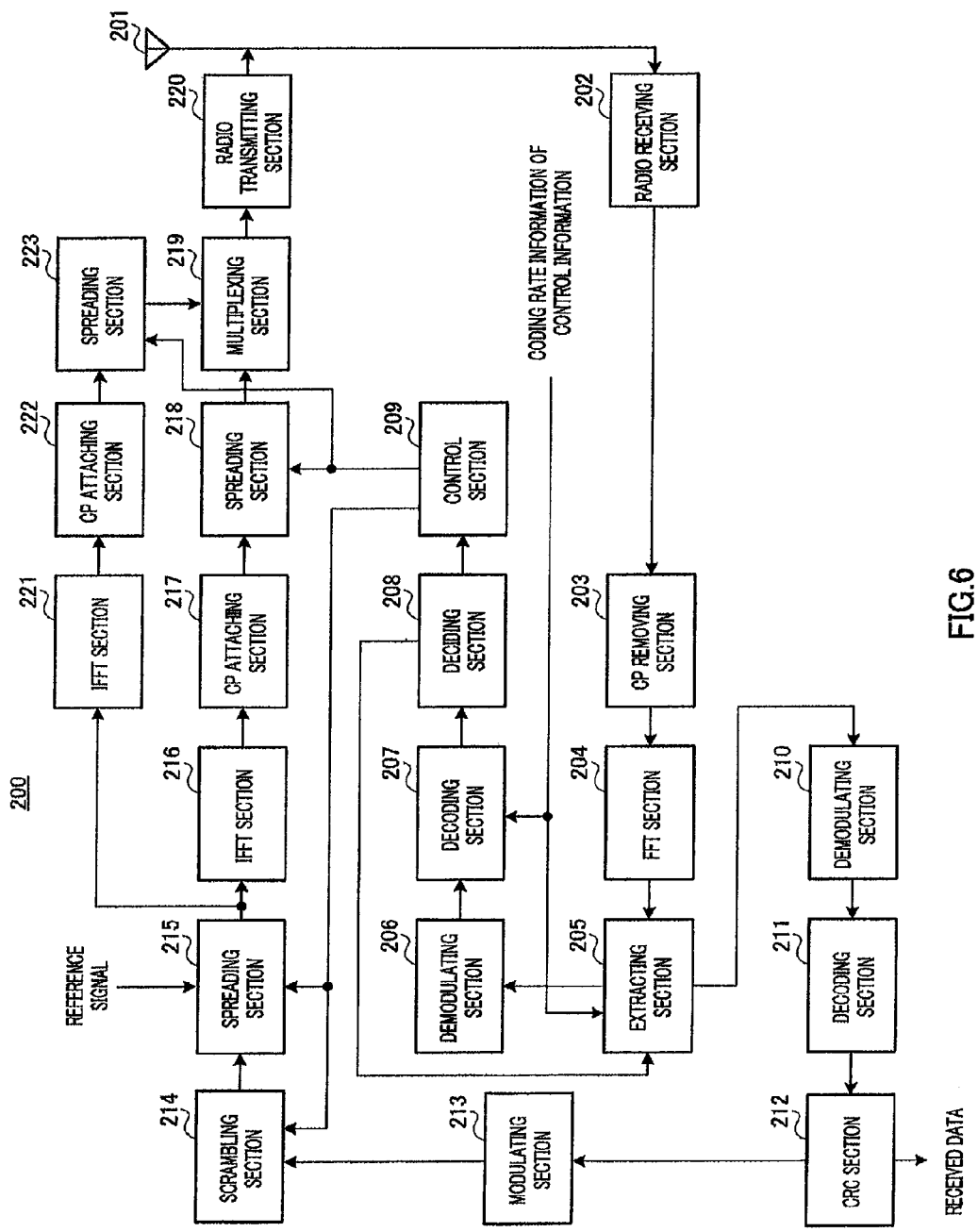
FIG. 6 is a block diagram showing the configuration of a mobile station according to Embodiment 1 of the present invention.

FIG. 5 illustrates the configuration of base station 100 according to the present embodiment, and FIG. 6 illustrates the configuration of mobile station 200 according to the present embodiment.

Here, to avoid complicated explanation, FIG. 5 illustrates components associated with transmission of downlink data and components associated with reception of uplink response signals to the downlink data, which are closely related to the present invention, and illustration and explanation of the components associated with reception of uplink data will be omitted. Similarly, FIG. 6 illustrates components associated with reception of downlink data and components associated with transmission of uplink response signals to the downlink data, which are closely related to the present invention, and illustration and explanation of the components associated with transmission of uplink data will be omitted.

Also, a case will be described with the following explanation, where ZAC sequences are used in first spreading and block-wise spreading code sequences are used in second spreading. Here, for first spreading, it is equally possible to use sequences, which can be separated from each other because of different cyclic shift values, other than ZAC sequences. For example, for first spreading, it is possible to use a GCL (Generated Chip like) sequence, CAZAC (Constant Amplitude Zero Auto Correlation) sequence, ZC (Zad-off-Chu) sequence or PN sequence such as an M sequence and orthogonal Gold code sequence. Also, as block-wise spreading code sequences for second spreading, it is possible to use any sequences as long as these sequences are orthogonal or substantially orthogonal to each other. For example, it is possible to use Walsh sequences or Fourier sequences as block-wise spreading code sequences for second spreading.

Also, in the following explanation, twelve ZAC sequences with a sequence length of 12 and of cyclic shift values "0" to "11" are referred to as "ZAC #0" to "ZAC #11," and three block-wise spreading code sequences with a sequence length of 4 and of sequence numbers "0" to "2" are referred to as "BW #0" to "BW #2." Here, the present invention is not limited to these sequence lengths.

Also, in the following explanation, the PUCCH numbers are determined by the cyclic shift values of ZAC sequences and the sequence numbers of block-wise spreading code sequences. That is, a plurality of resources for response signals are determined by ZAC #0 to ZAC #11, which can be separated from each other because of different cyclic shift values, and BW #0 to BW #2, which are orthogonal to each other.

Also, in the following explanation, the CCE numbers and the PUCCH numbers are associated on a one-to-one basis. That is, CCE #0 is mapped to PUCCH #0, CCE #1 is mapped to PUCCH #1, CCE #2 is mapped to PUCCH #2 . . . , and so on.

In base station 100 shown in FIG. 5, control information generating section 101 and mapping section 104 receive as input a resource allocation result of downlink data. Also, control information generating section 101 and encoding section 102 receive as input a coding rate of control information to report the resource allocation result of downlink data, on a per mobile station basis, as coding rate information. Here, in the same way as above, the coding rate of the control information is one of 2/3, 1/3, 1/6 and 1/12.

Control information generating section 101 generates control information to report the resource allocation result, on a per mobile station basis, and outputs the control information to encoding section 102. Control information, which is provided per mobile station, includes mobile station ID information to indicate to which mobile station the control information is directed. For example, control information includes, as mobile station ID information, CRC bits masked by the ID number of the mobile station, to which control information is reported. Further, according to the coding rate information received as input, control information generating section 101 allocates an L1/L2 CCH to each mobile station based on the number of CCE's required to report the control information, and outputs the CCE number corresponding to the allocated L1/L2 CCH to mapping section 104. Here, in the same way as above, an L1/L2 CCH occupies one CCE when the coding rate of control information is 2/3. Therefore, an L1/L2 CCH occupies two CCE's when the coding rate of control information is 1/3, an L1/L2 CCH occupies four CCE's when the coding rate of control information is 1/6, and an L1/L2 CCH occupies eight CCE's when the coding rate of control information is 1/12. Also, in the same way as above, when one L1/L2 CCH occupies a plurality of CCE's, the CCE's occupied by the L1/L2 CCH are consecutive.

Encoding section 102 encodes control information on a per mobile station basis according to the coding rate information received as input, and outputs the encoded control information to modulating section 103.

Modulating section 103 modulates the encoded control information and outputs the result to mapping section 104.

On the other hand, encoding section 105 encodes the transmission data for each mobile station (i.e., downlink data) and outputs the encoded transmission data to retransmission control section 106.

Upon initial transmission, retransmission control section 106 holds the encoded transmission data on a per mobile station basis and outputs the data to modulating section 107. Retransmission control section 106 holds transmission data until retransmission control section 106 receives as input an ACK of each mobile station from deciding section 117. Further, upon receiving as input a NACK of each mobile station from deciding section 117, that is, upon retransmission, retransmission control section 106 outputs the transmission data matching that NACK to modulating section 107.

Modulating section 107 modulates the encoded transmission data received as input from retransmission control section 106, and outputs the result to mapping section 104.

Upon transmission of control information, mapping section 104 maps the control information received as input from modulating section 103 on a physical resource based on the CCE number received as input from control information generating section 101, and outputs the result to IFFT section 108. That is, mapping section 104 maps control information on the subcarrier corresponding to the CCE number in a plurality of subcarriers forming an orthogonal frequency division multiplexing (OFDM) symbol, on a per mobile station basis.

On the other hand, upon transmission of downlink data, mapping section 104 maps the transmission data, which is provided on a per mobile station basis, on a physical resource based on the resource allocation result, and outputs the result to IFFT section 108. That is, based on the resource allocation result, mapping section 104 maps transmission data on a subcarrier in a plurality of subcarriers comprised of an OFDM symbol, on a per mobile station basis.

IFFT section 108 generates an OFDM symbol by performing an IFFT of a plurality of subcarriers on which control information or transmission data is mapped, and outputs the OFDM symbol to CP (Cyclic Prefix) attaching section 109.

CP attaching section 109 attaches the same signal as the signal at the tail end part of the OFDM symbol, to the head of the OFDM symbol as a CP.

Radio transmitting section 110 performs transmission processing such as digital-to-analog (D/A) conversion, amplification and up-conversion on the OFDM symbol with a CP and transmits the result from antenna 111 to mobile station 200 (in FIG. 6).

On the other hand, radio receiving section 112 receives a response signal or reference signal transmitted from mobile station 200 (in FIG. 6), via antenna 111, and performs receiving processing such as down-conversion and analog-to-digital (A/D) conversion on the response signal or reference signal.

CP removing section 113 removes the CP attached to the response signal or reference signal subjected to receiving processing.

Despreading section 114 despreads the response signal by a block-wise spreading code sequence that is used in second spreading in mobile station 200, and outputs the despread response signal to correlation processing section 115. Similarly, despreading section 114 despreads the reference signal by an orthogonal sequence that is used to spread the reference signal in mobile station 200, and outputs the despread reference signal to correlation processing section 115.

Correlation processing section 115 finds the correlation value between the despread response signal, despread reference signal and ZAC sequence that is used in first spreading in mobile station 200, and outputs the correlation value to descrambling section 116.

Descrambling section 116 descrambles the correlation value by the scrambling code associated with the cyclic shift value of the ZAC sequence, and outputs the descrambled correlation value to deciding section 117.

Deciding section 117 detects a response signal on a per mobile station basis, by detecting a correlation peak on a per mobile station basis using detection windows. For example, upon detecting a correlation peak in the detection window for mobile station #1, deciding section 117 detects a response signal from mobile station #1. Then, deciding section 117 decides whether the detected response signal is an ACK or NACK by the synchronous detection using the correlation value of the reference signal, and outputs the ACK or NACK to retransmission control section 106 on a per mobile station basis.

On the other hand, in mobile station 200 shown in FIG. 6, radio receiving section 202 receives the OFDM symbol transmitted from base station 100 (in FIG. 5), via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing a FFT of the OFDM symbol, and outputs the control information or downlink data to extracting section 205.

Extracting section 205 and decoding section 207 receive as input coding rate information indicating the coding rate of the control information, that is, information indicating the number of CCE's occupied by an L1/L2 CCH.

Upon reception of the control information, based on the coding rate information, extracting section 205 extracts the control information from the plurality of subcarriers and outputs it to demodulating section 206.

Demodulating section 206 demodulates the control information and outputs the demodulated control information to decoding section 207.

Decoding section 207 decodes the control information based on the coding rate information received as input, and outputs the decoded control information to deciding section 208.

On the other hand, upon receiving the downlink data, extracting section 205 extracts the downlink data directed to the mobile station from the plurality of subcarriers, based on the resource allocation result received as input from deciding section 208, and outputs the downlink data to demodulating section 210. This downlink data is demodulated in demodulating section 210, decoded in decoding section 211 and received as input in CRC section 212.

CRC section 212 performs an error detection of the decoded downlink data using a CRC check, generates an ACK in the case of CRC=OK (i.e., when no error is found) and a NACK in the case of CRC=NG (i.e., when error is found), as a response signal, and outputs the generated response signal to modulating section 213. Further, in the case of CRC=OK (i.e., when no error is found), CRC section 212 outputs the decoded downlink data as received data.

Deciding section 208 performs a blind detection of whether or not the control information received as input from decoding section 207 is directed to the mobile station. For example, deciding section 208 decides that, if CRC=OK is found (i.e., if no error is found) as a result of demasking CRC bits by the ID number of the mobile station, the control information is directed to the mobile station. Further, deciding section 208 outputs the control information for the mobile station, that is, the resource allocation result of downlink data for the mobile station, to extracting section 205.

Further, deciding section 208 decides a PUCCH to use to transmit a response signal from the mobile station, from the CCE number associated with subcarriers on which the control information directed to the mobile station is mapped, and outputs the decision result (i.e., PUCCH number) to control section 209. For example, in the same way as above, when the CCE corresponding to subcarriers, on which control information directed to the mobile station is mapped, is CCE #0, deciding section 208 decides PUCCH #0 associated with CCE #0 as the PUCCH for the mobile station. Also, for example, when CCE's corresponding to subcarriers on which control information directed to the mobile station is mapped are CCE #0 to CCE #3, deciding section 208 decides PUCCH #0 associated with CCE #0, which is the smallest number in CCE #0 to CCE #3, as the PUCCH for the mobile station, and, when CCE's corresponding to subcarriers on which control information directed to the mobile station is mapped are CCE #4 to CCE #7, deciding section 208 decides PUCCH #4 associated with CCE #4, which is the smallest number in CCE #0 to CCE #3, as the PUCCH for the mobile station.

Based on the PUCCH number received as input from deciding section 208, control section 209 controls the cyclic shift value of a ZAC sequence that is used in first spreading in spreading section 215 and a block-wise spreading code sequence that is used in second spreading in spreading section 218. That is, control section 209 selects a ZAC sequence of the cyclic shift value corresponding to the PUCCH number received as input from deciding section 208, amongst ZAC #0 to ZAC #11, and sets the selected ZAC sequence in spreading section 215, and selects the block-wise spreading code sequence corresponding to the PUCCH number received as input from deciding section 208, amongst BW #0 to BW #2, and sets the selected block-wise spreading code sequence in spreading section 218. That is, control section 209 selects one of a plurality of resources defined by ZAC #0 to ZAC #11 and BW #0 to BW #2. Also, control section 209 reports the selected ZAC sequence to scrambling section 214.

Further, control section 209 controls a block-wise spreading code sequence that is used in second spreading in spreading section 223. That is, control section 209 sets the block-wise spreading code sequence corresponding to the PUCCH number received as input from deciding section 208, in spreading section 223.

Modulating section 213 modulates the response signal received as input from CRC section 212 and outputs the result to scrambling section 214. Modulation processing in modulating section 213 will be described later in detail.

Scrambling section 214 multiplies the modulated response signal (i.e., response symbol) by a scrambling code "1" or "−1" depending on the ZAC sequence selected in control section 209, and outputs the response signal multiplied by the scrambling code to spreading section 215. Here, by multiplication of the scrambling code "−1," the constellation of the response signal is rotated. That is, the ACK received as input from modulating section 213 and multiplied by the scrambling code "−1" is allocated to the signal point of a NACK in the constellation used for modulation in modulating section 213, and the NACK received as input from modulating section 213 and multiplied by the scrambling code "−1" is allocated to the signal point of an ACK in the constellation used for modulation in modulating section 213. Thus, scrambling section 214 functions as a rotation means to rotate the constellation of a response signal. Scrambling processing in scrambling section 214 will be described later in detail.

Spreading section 215 performs first spreading of the response signal and reference signal (i.e., reference symbol) by the ZAC sequence set in control section 209, and outputs the response signal subjected to first spreading to IFFT section 216 and the reference signal subjected to first spreading to IFFT section 221.

IFFT section 216 performs an IFFT of the response signal subjected to first spreading, and outputs the response signal subjected to an IFFT to CP attaching section 217.

CP attaching section 217 attaches the same signal as the signal at the tail end part of the response signal subjected to an IFFT, to the head of the response signal as a CP.

Spreading section 218 performs second spreading of the response signal with a CP by the block-wise spreading code sequence set in control section 209, and outputs the response signal subjected to second spreading, to multiplexing section 219.

IFFT section 221 performs an IFFT of the reference signal subjected to first spreading, and outputs the reference signal subjected to an IFFT to CP attaching section 222.

CP attaching section 222 attaches the same signal as the signal at the tail end part of the reference signal subjected to an IFFT, to the head of the reference signal.

Spreading section 223 performs second spreading of the reference signal with a CP by the block-wise spreading code sequence set in control section 209, and outputs the reference signal subjected to second spreading, to multiplexing section 219.

Multiplexing section 219 time-multiplexes the response signal subjected to second spreading and the reference signal subjected to second spreading in one slot, and outputs the result to radio transmitting section 220.

Radio transmitting section 220 performs transmission processing such as D/A conversion, amplification and up-conversion on the response signal subjected to second spreading or the reference signal subjected to second spreading, and transmits the resulting signal from antenna 201 to base station 100 (in FIG. 3).

Next, modulation processing in modulating section 213 and scrambling processing in scrambling section 214 will be explained in detail.

Figure 1:
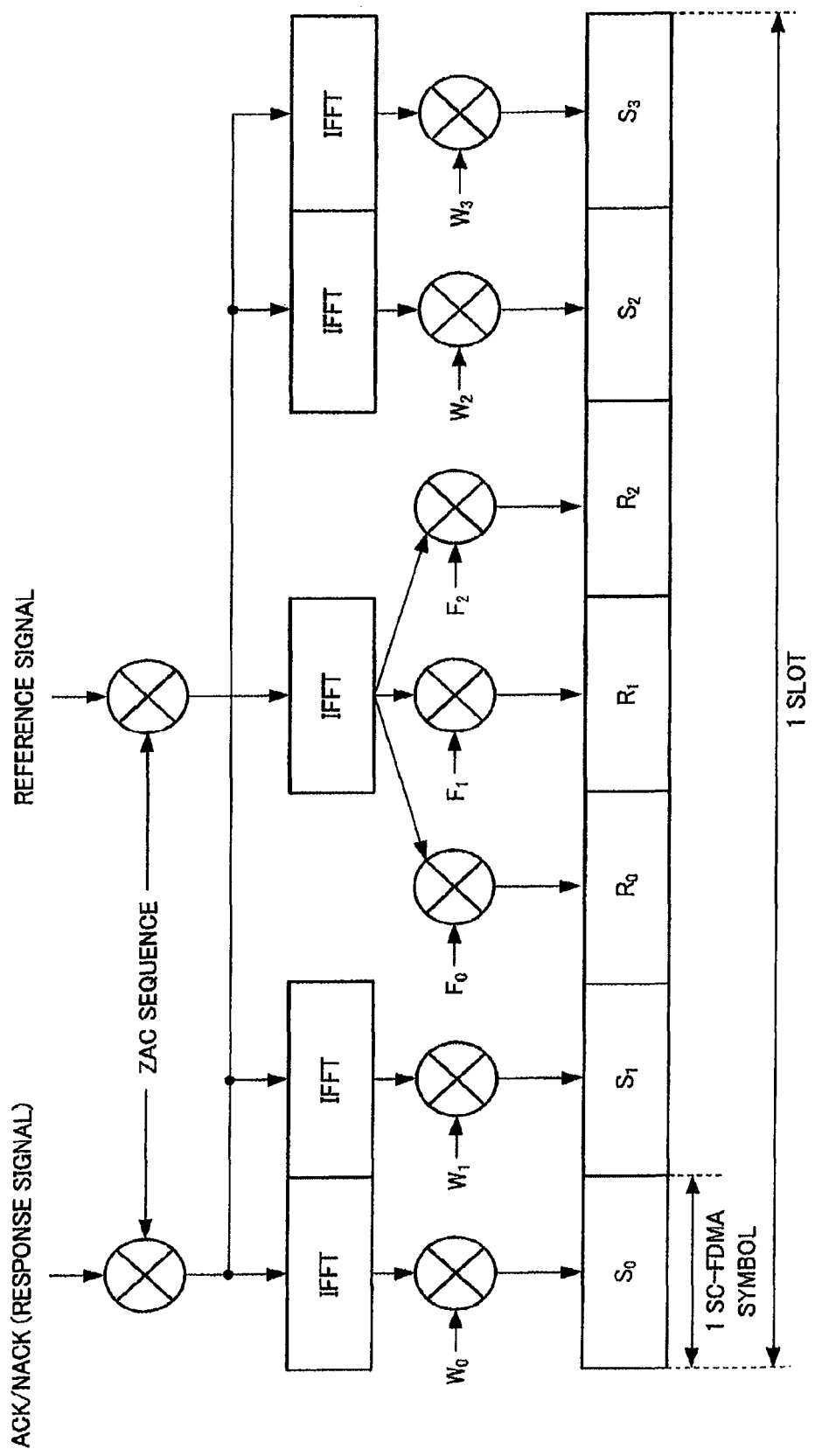
FIG. 1 is a diagram showing a spreading method of a response signal and reference signal (prior art)
Figure 2:
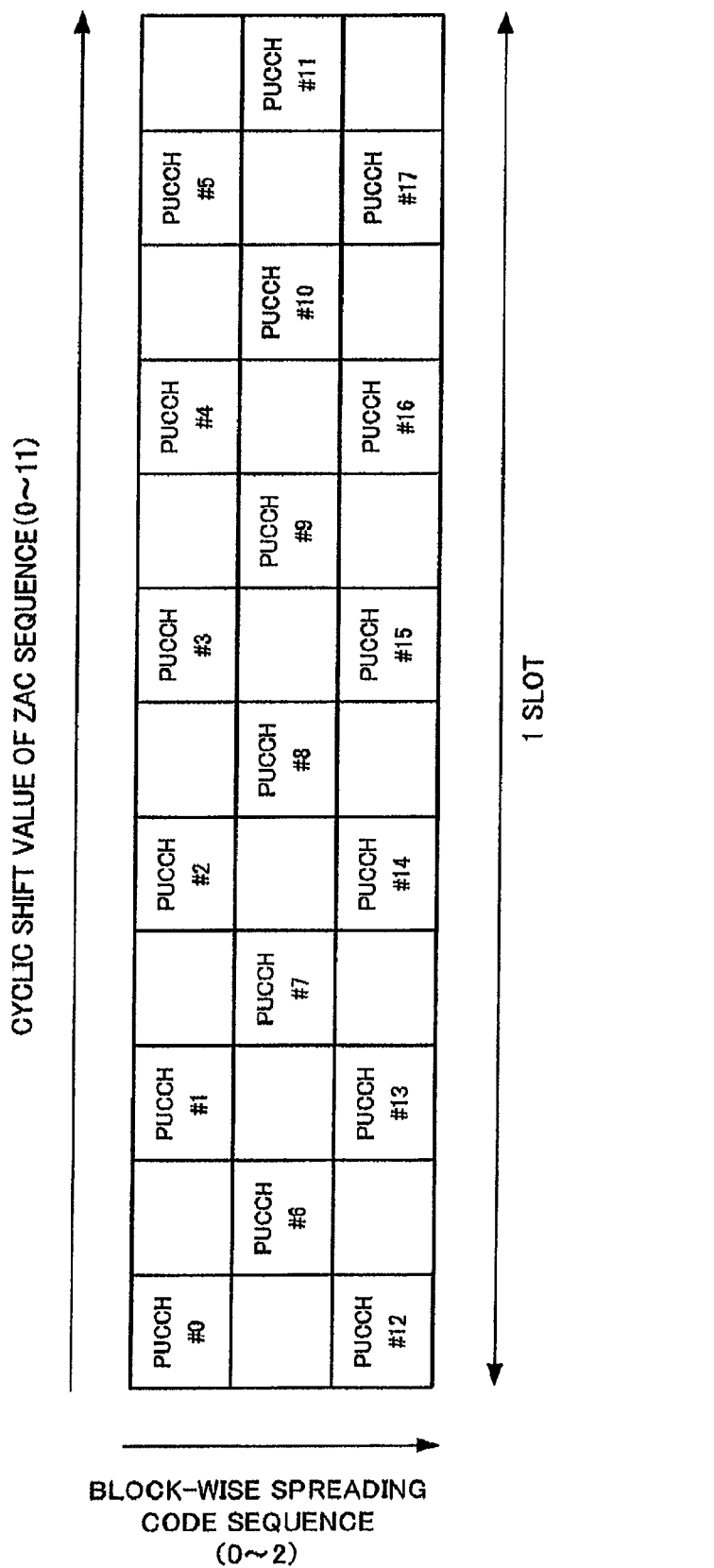
FIG. 2 is a diagram showing the definition of PUCCH (prior art)

In a plurality of response signals subject to second spreading by the same block-wise spreading code sequence, inter-code interference on the cyclic shift axis is the largest between the response signals that are located on the closest positions to each other on the cyclic shift axis. For example, in six response signals subject to second spreading by BW #0 in FIG. 2, the response signal that is transmitted using PUCCH #1 is subject to the largest interference from the response signal that is transmitted using PUCCH #0 and the response signal that is transmitted using PUCCH #2.

Also, the ACK occurrence rate is significantly higher than the NACK occurrence rate, and, consequently, when a NACK is transmitted using an arbitrary PUCCH, there is a high possibility that a response signal that interferes with the PUCCH is an ACK. Therefore, to improve the error rate performance of a NACK, it is important to reduce interference from an ACK.

Figure 7:
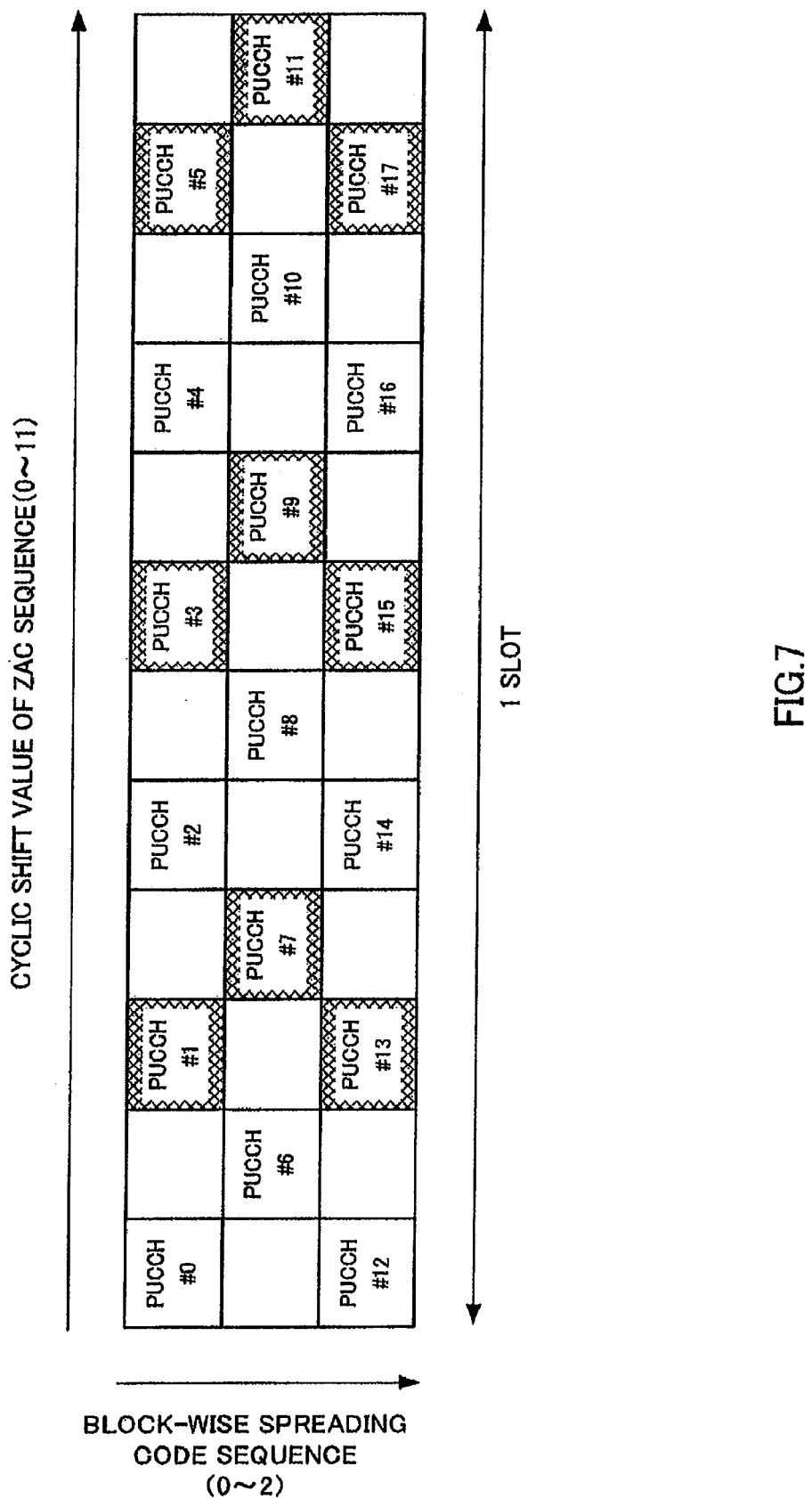
FIG. 7 is a diagram showing a constellation change according to Embodiment 1 of the present invention.

Therefore, with the present embodiment, as shown in FIG. 7, the constellation of each response signal is inverted by rotating the constellation of each constellation by 180 degrees on the cyclic shift axis.

Figure 8:
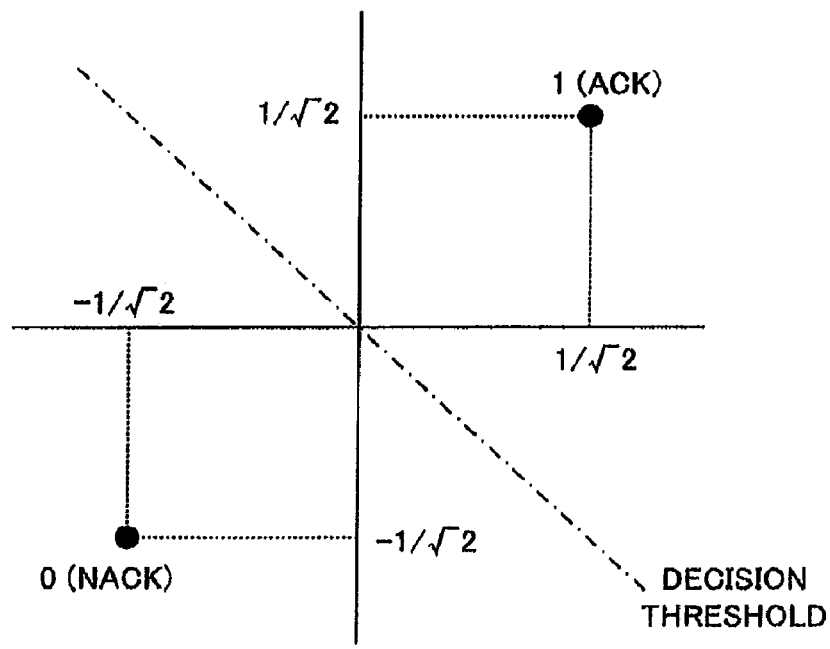
FIG. 8 illustrates a BPSK constellation according to Embodiment 1 of the present invention.
Figure 9:
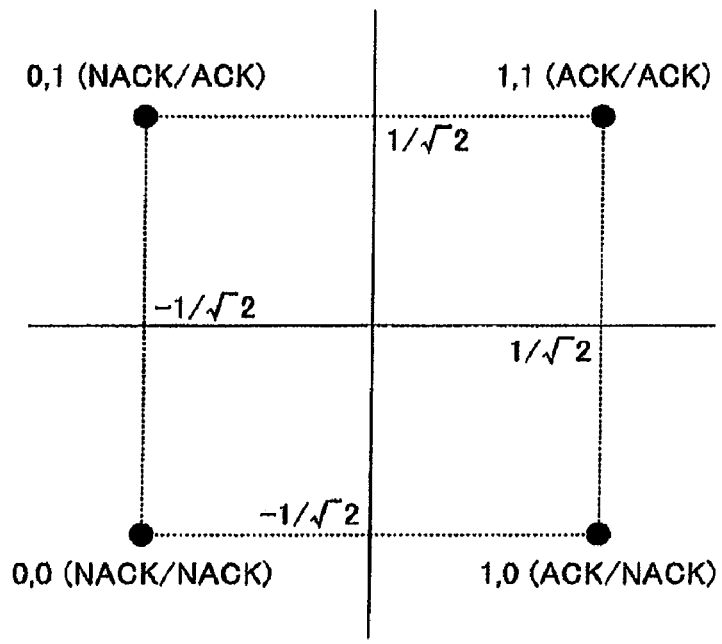
FIG. 9 illustrates a QPSK constellation according to Embodiment 1 of the present invention.

To be more specific, referring to six response signals subject to second spreading by BW #0 in FIG. 7, the constellation acquired by inverting the constellation of a response signal that is transmitted using PUCCH #0, is used as the constellation of a response signal that is transmitted using PUCCH #1, and the constellation acquired by inverting the constellation of the response signal that is transmitted using PUCCH #1, is used as the constellation of a response signal that is transmitted using PUCCH #2. The same applies to PUCCH #2 to PUCCH #5. For example, when the modulation scheme of response signals is BPSK, constellation #1 of PUCCH #0, PUCCH #2 and PUCCH #4 is as shown in FIG. 3, while constellation #2 of PUCCH #1, PUCCH #3 and PUCCH #5 is as shown in FIG. 8. Also, for example, when the modulation scheme of response signals is QPSK, constellation #1 of PUCCH #0, PUCCH #2 and PUCCH #4 is as shown in FIG. 4, while constellation #2 of PUCCH #1, PUCCH #3 and PUCCH #5 is as shown in FIG. 9.

Thus, according to the present embodiment, in ZAC #0, ZAC #2, ZAC #4, ZAC #6, ZAC #8 and ZAC #10 that are used in first spreading of response signals subject to second spreading by BW #0, response signals subject to first spreading by ZAC #0, ZAC #4 and ZAC #8 form the first response signal group, and response signals subject to first spreading by ZAC #2, ZAC #6 and ZAC #10 form the second response signal group. That is, according to the present embodiment, the response signals belonging to the first response signal group and the response signals belonging to the second response signal group are alternately allocated on the cyclic shift axis. Then, while the constellation of the first response signal group is constellation #1 (in FIG. 3 and FIG. 4), the constellation of the second response signal group is constellation #2 (in FIG. 8 and FIG. 9). That is, according to the present embodiment, the constellation of the second response signal group is inverted with respect to the constellation of the first response signal group.

Figure 10:
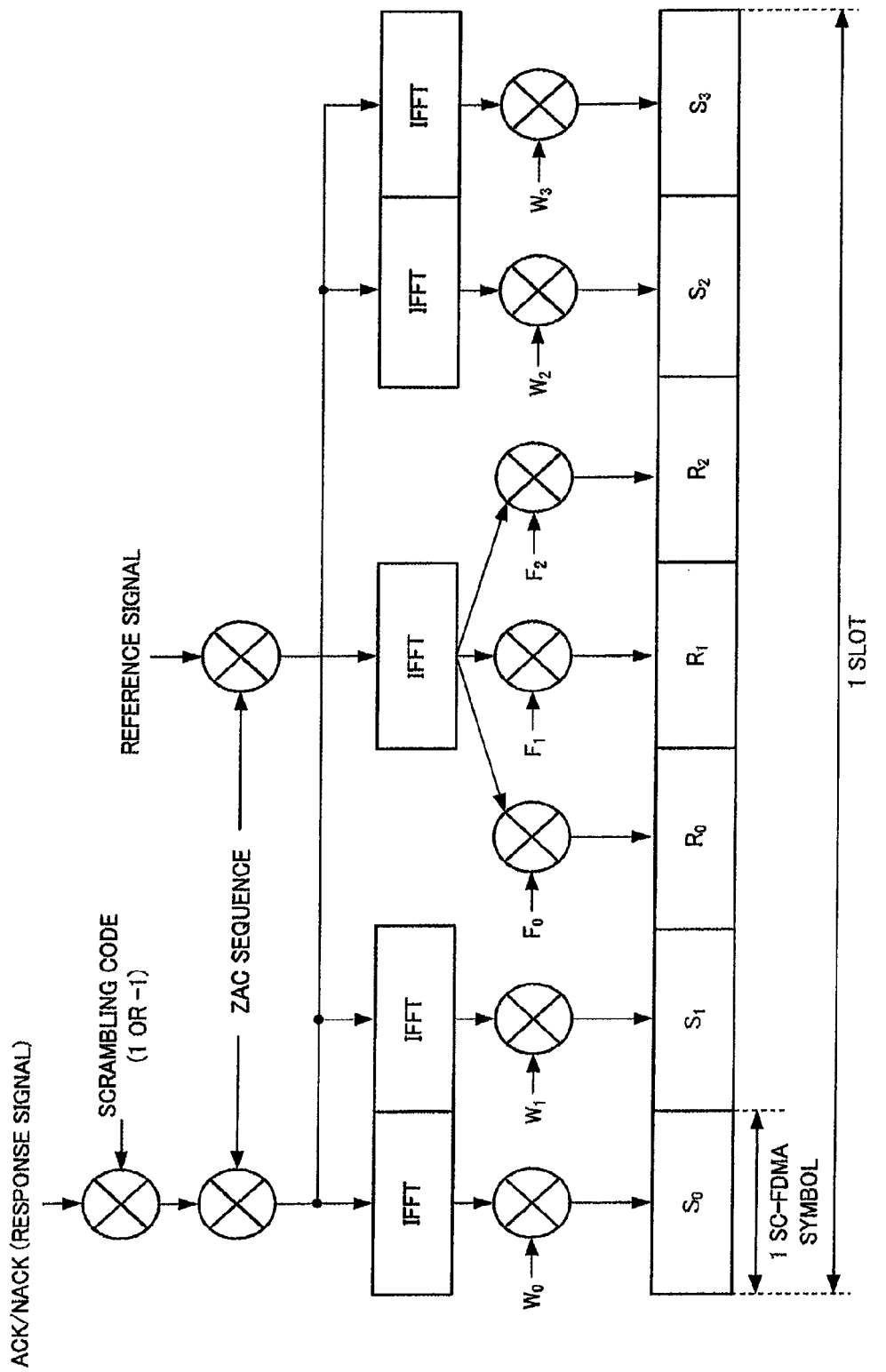
FIG. 10 is a diagram showing scrambling processing according to Embodiment 1 of the present invention.

Also, according to the present embodiment, as shown in FIG. 10, the inversion of constellation is performed by scrambling processing in scrambling section 214.

That is, when the modulation scheme of response signals is BPSK, modulating section 213 modulates the response signals using constellation #1 shown in FIG. 3. Therefore, the signal point of an ACK is $(-1/\sqrt{2}, -1/\sqrt{2})$, and the signal point of a NACK is $(1/\sqrt{2}, 1/\sqrt{2})$. Also, the signal point of a reference signal received as input from spreading section 215 is the same as the signal point of a NACK, $(1/\sqrt{2}, 1/\sqrt{2})$.

Then, in response signals subject to second spreading using BW #0, scrambling section 214 multiplies a response signal subject to first spreading using ZAC #0, ZAC #4 or ZAC #8 by scrambling code "1," and multiplies a response signal subject to first spreading using ZAC #2, ZAC #6 or ZAC #10 by scrambling code "−1." Therefore, for the response signal subject to first spreading by ZAC #0, ZAC #4 or ZAC #8, the signal point of an ACK is $(-1/\sqrt{2}, -1/\sqrt{2})$ and the signal point of a NACK is $(1/\sqrt{2}, 1/\sqrt{2})$. That is, the constellation of the response signal subject to first spreading by ZAC #0, ZAC #4 or ZAC #8 is constellation #1 (in FIG. 3). On the other hand, for the response signal subject to first spreading by ZAC #2, ZAC #6 or ZAC #10, the signal point of an ACK is $(1/\sqrt{2}, 1/\sqrt{2})$ and the signal point of a NACK is $(-1/\sqrt{2}, -1/\sqrt{2})$. That is, the constellation of the response signal subject to first spreading by ZAC #2, ZAC #6 or ZAC #10 is constellation #2 (in FIG. 8).

Thus, according to the present embodiment, by scrambling processing in scrambling section 214, the constellation of the second response signal group is inverted with respect to the constellation of the first response signal group.

As described above, an example case will be described below where mobile station #1 transmits a response signal using PUCCH #1 (in FIG. 7) and another mobile station #2 transmits a response signal using PUCCH #0 (in FIG. 7). Therefore, constellation #2 (in FIG. 8) is used for the response signal of mobile station #1 and constellation #1 (in FIG. 3) is used for the response signal of mobile station #2.

When mobile station #1 and mobile station #2 both transmit an ACK and the base station receives the response signal from mobile station #1, interference given from the response signal of mobile station #2 to the response signal of mobile station #1 is as follows.

That is, when the NACK and reference signal transmitted from mobile station #1 are received by the base station via a channel, in the base station, a response signal represented by $(1+j)h1/\sqrt{2}$ and a reference signal represented by $(1+j)h1/\sqrt{2}$ are found as a correlation output of mobile station #1.

Also, when the ACK and reference signal transmitted from mobile station #2 are received by the base station via a channel, in the base station, the component represented by $(-1-j)h2/\sqrt{2}$ is found as interference to the response signal of mobile station #1 and the component represented by $(1+j)h2/\sqrt{2}$ is found as interference to the reference signal of mobile station #1 in the correlation output of mobile station #1.

Therefore, when the ACK from mobile station #1 and the ACK from mobile station #2 are code-multiplexed, in the base station, a response signal represented by $(1+j)(h1-h2)/\sqrt{2}$ and a reference signal represented by $(1+j)(h1+h2)/\sqrt{2}$ are found in the correlation output of mobile station #1.

Therefore, the interference component given from the ACK of mobile station #2 to the NACK of mobile station #1 (i.e., the Euclidean distance from $(1+j)/\sqrt{2}$) by the synchronous detection in the base station, is represented by equation 2. That is, when both mobile station #1 and mobile station #2 transmit an ACK, there is no inter-code interference between the ACK of mobile station #1 and the ACK of mobile station #2.

Also, when mobile station #1 transmits a NACK, mobile station #2 transmits an ACK and the base station receives the response signal from mobile station #1, interference given from the response signal of mobile station #2 to the response signal of mobile station #1 is as follows.

That is, when the NACK and reference signal transmitted from mobile station #1 are received by the base station via a channel, in the base station, a response signal represented by $(1-j)h1/\sqrt{2}$ and a reference signal represented by $(1+j)h1/\sqrt{2}$ are found as a correlation output of mobile station #1.

Also, when the ACK and reference signal transmitted from mobile station #2 are received by the base station via a channel, in the base station, the component represented by $(-1-j)h2/\sqrt{2}$ is found as interference to the response signal of mobile station #1 and the component represented by $(1+j)h2/\sqrt{2}$ is found as interference to the reference signal of mobile station #1 in the correlation output of mobile station #1.

Therefore, when an ACK from mobile station #1 and an ACK from mobile station #2 are code-multiplexed, in the base station, a response signal represented by $(-1-j)(h1+h2)/\sqrt{2}$ and a reference signal represented by $(1+j)(h1+h2)/\sqrt{2}$ are found in the correlation output of mobile station #1.

Therefore, the interference component given from the ACK of mobile station #2 to the ACK of mobile station #1 (i.e., the Euclidean distance from $(-1-j)/\sqrt{2}$) by the synchronous detection in the base station, is represented by equation 1. That is, according to the present embodiment, when mobile station #1 transmits a NACK and mobile station #2 transmits an ACK, inter-code interference does not occur between the NACK of mobile station #1 and the ACK of mobile station #2.

Similarly, according to the present embodiment, when mobile station #1 and mobile station #2 both transmit a NACK, as shown in equation 4, significant inter-code interference may be given from the NACK of mobile station #2 and the NACK of mobile station #1. Also, according to the present embodiment, when mobile station #1 transmits an ACK and mobile station #2 transmits a NACK, as shown in equation 3 inter-code interference does not occur between the ACK of mobile station #1 to the NACK of mobile station #2.

Thus, the present embodiment makes interference given from a NACK to an ACK zero by inverting the constellation of each response signal on the cyclic shift axis.

Also, as described above, the ACK occurrence rate is significantly higher than the NACK occurrence rate, and, consequently, when a response signal of mobile station #1 is a NACK, there is an extremely low possibility that a response signal of mobile station #2 is also a NACK. That is, there is an extremely low possibility that a response signal that interferes with a NACK is a NACK. Therefore, there is little possibility that an increased NACK error rate is caused by interference between NACK's. That is, the interference component of equation 4 that occurs in the present embodiment is not a problem.

Also, according to the present embodiment, there is a large possibility that the interference shown in equation 2 occurs between ACK's. However, as described above, if a base station receives an ACK from a mobile station as a NACK by mistake, unnecessary retransmission of downlink data is performed, and, consequently, there is little influence on the communication system due to an increased error rate of an ACK.

Thus, according to the present embodiment, the constellation of each response signal is inverted on the cyclic shift axis, so that it is possible to prevent an increased NACK error rate due to inter-code interference from an ACK and improve the error rate performance of a NACK compared to the prior art.

Embodiment 2

With the present embodiment, Embodiment 1 is implemented only in a specific slot among a plurality of slots forming one subframe.

For example, when one subframe is formed with two slots of slot #0 and slot #1, the constellation of the first response signal group and the constellation of the second response signal group are both constellation #1 (in FIG. 3 and FIG. 4) in slot #0, while, as in Embodiment 1, the constellation of the first response signal group is constellation #1 (in FIG. 3 and FIG. 4) and the constellation of the second response signal group is constellation #2 (in FIG. 8 and FIG. 9) in slot #1. By this means, it is possible to improve the error rate performance of an ACK in slot #0.

Therefore, according to the present embodiment, by adjusting the number of specific slots in which a constellation is inverted (as in Embodiment 1), it is possible to easily adjust both the ACK error rate and the NACK error rate according to the target error rate.

Also, according to the present embodiment, a modulation scheme used in slot #0 and a modulation scheme used in slot #1 may be different from each other. For example, it is possible to use QPSK in slot #1 when BPSK is used in slot #0, or use BPSK in slot #1 when QPSK is used in slot #0.

Embodiment 3

Figure 11:
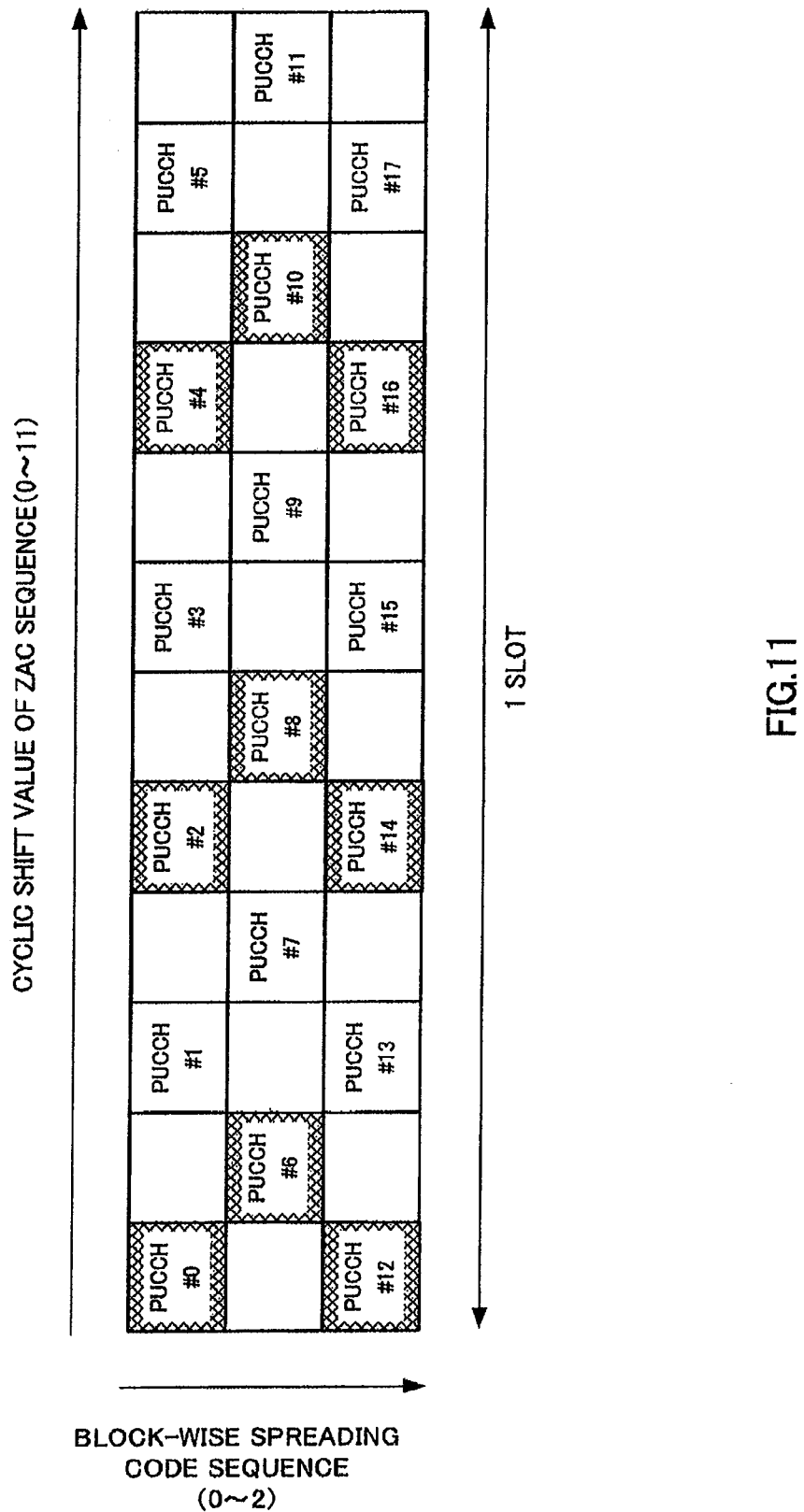
FIG. 11 is a diagram showing a constellation change according to Embodiment 3 of the present invention.

With the present embodiment, for example, while the constellation is inverted in cell #1 as shown in FIG. 7, the constellation is inverted in cell #2 adjacent to cell #1 as shown in FIG. 11. Therefore, for example, referring to PUCCH #1, while constellation #2 (in FIG. 8 and FIG. 9) is used for PUCCH #1 in cell #1, constellation #1 (in FIG. 3 and FIG. 4) is used for PUCCH #1 in cell #2. Similarly, referring to PUCCH #2, while constellation #1 (in FIG. 3 and FIG. 4) is used for PUCCH #2 in cell #1, constellation #2 (in FIG. 8 and FIG. 9) is used for PUCCH #2 in cell #2.

That is, with the present invention, further to Embodiment 1, between two adjacent cells, the constellation of one of two response signals subject to first spreading by ZAC sequences of the same cyclic shift value, is inverted with respect to the constellation of the other response signal.

By this means, between a plurality of adjacent cells, it is possible to randomize interference between a plurality of response signals subject to first spreading by ZAC sequences of the same cyclic shift value. That is, according to the present embodiment, it is possible to randomize and reduce inter-cell interference between response signals.

Embodiment 4

With the present embodiment, the constellation is inverted upon modulation of response signals.

Figure 12:
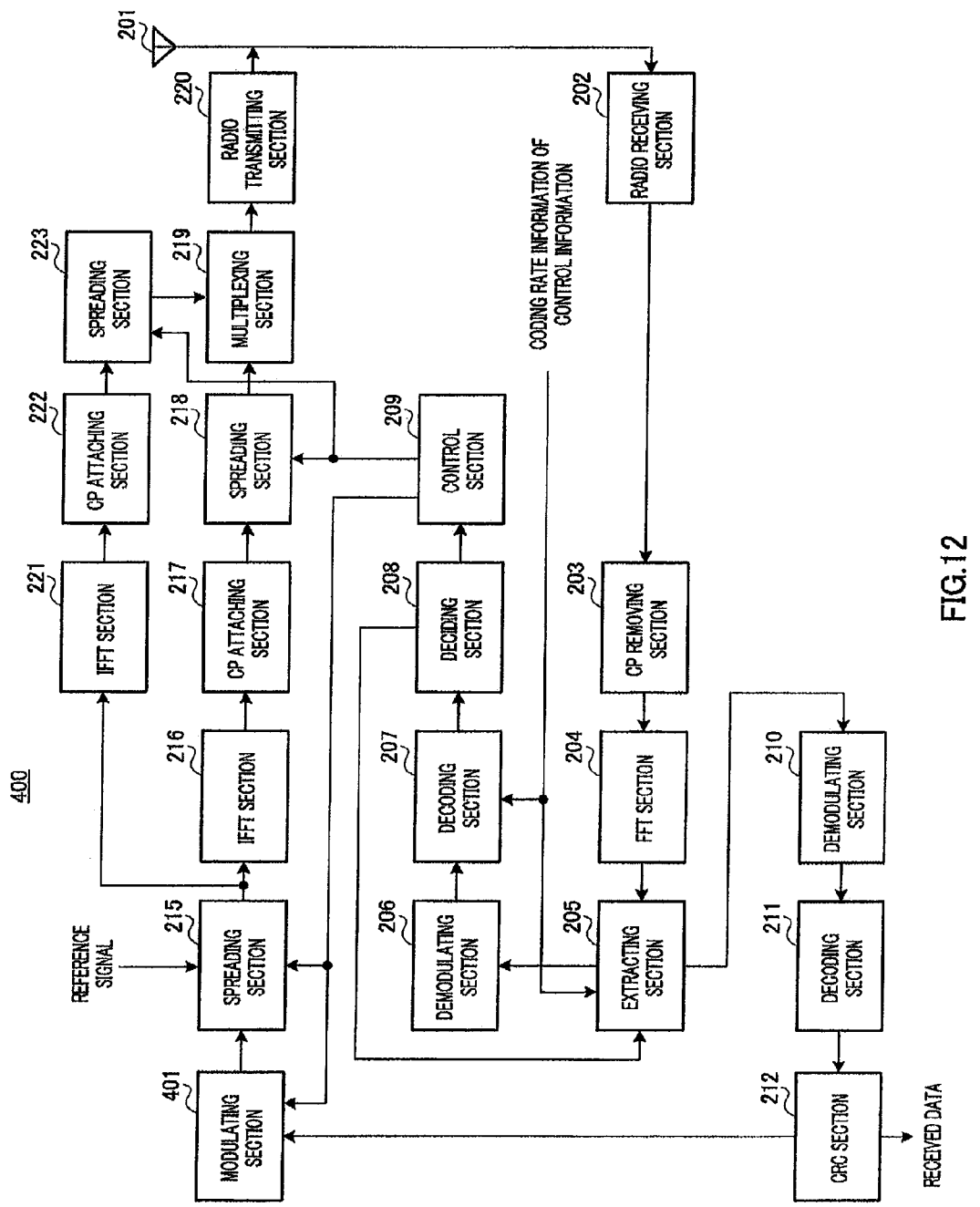
FIG. 12 is a block diagram showing the configuration of a mobile station according to Embodiment 4 of the present invention.

FIG. 12 illustrates the configuration of mobile station 400 according to the present embodiment. Here, in FIG. 12, the same components as in FIG. 6 (Embodiment 1) will be assigned the same reference numerals and their explanation will be omitted.

In mobile station 400, a ZAC sequence selected in control section 209 is reported to modulating section 401.

Then, in response signals subject to second spreading using BW #0 shown in FIG. 7, modulating section 401 modulates a response signal subject to first spreading by ZAC #0, ZAC #4 or ZAC #8 (i.e., first response signal group) using constellation #1 (in FIG. 3 and FIG. 4), and modulates a response signal subject to first spreading by ZAC #2, ZAC #6 or ZAC #10 (i.e., second response signal group) using constellation #2 (in FIG. 8 and FIG. 9).

Thus, according to the present embodiment, upon modulation processing in modulating section 401, the constellation of the second response signal group is inverted with respect to the constellation of the first response signal group. That is, according to the present embodiment, modulating section 401 functions as a modulating means that modulates a response signal and as an inverting means that inverts the constellation of the response signal. Therefore, the present embodiment does not require scrambling section 214 (in FIG. 6) and descrambling section 116 (in FIG. 5) in Embodiment 1.

Thus, by performing inversion processing of the constellation in modulating section 401 instead of scrambling section 214, it is possible to achieve the same effect as in Embodiment 1.

Embodiment 5

Figure 13:
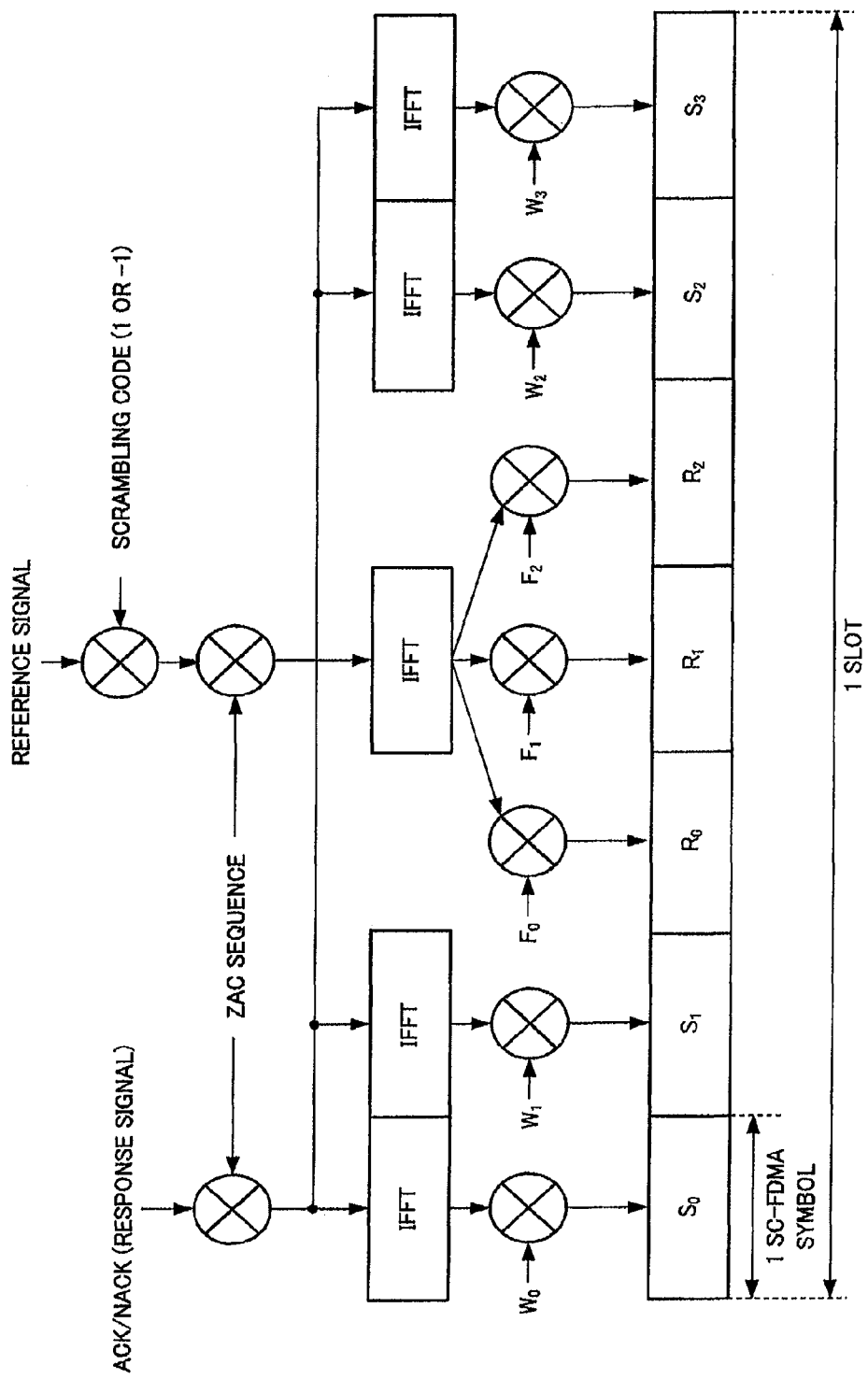
FIG. 13 is a diagram showing scrambling processing according to Embodiment 5 of the present invention.

Embodiments 1 to 4 invert the constellation of a response signal without changing the constellation of a reference signal. By contrast with this, as shown in FIG. 13, the present embodiment inverts the constellation of a reference signal without changing the constellation of a response signal.

Figure 14:
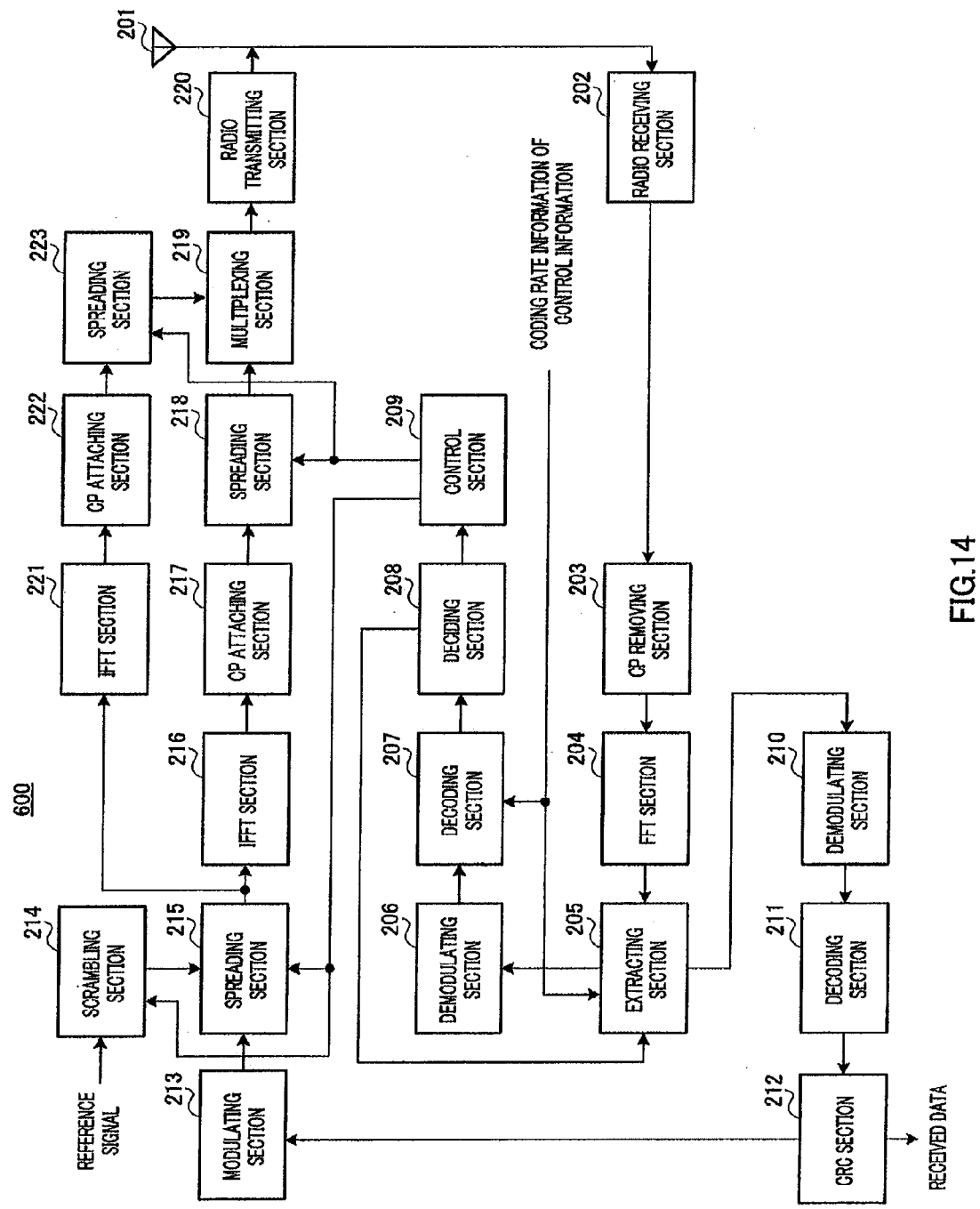
FIG. 14 is a block diagram showing the configuration of a mobile station according to Embodiment 5 of the present invention.

FIG. 14 illustrates the configuration of mobile station 600 according to the present embodiment. Here, in FIG. 14, the same components as in FIG. 6 (Embodiment 1) will be assigned the same reference numerals and their explanation will be omitted.

In mobile station 600, when the modulation scheme of response signals is BPSK, scrambling section 214 multiplies a reference signal subject to first spreading using ZAC #0, ZAC #4 or ZAC #8 by "1," and multiplies a reference signal subject to first spreading using ZAC #2, ZAC #6 or ZAC #10 by "−1." Therefore, the signal point of a reference signal subject to first spreading by ZAC #0, ZAC #4 or ZAC #8 is $(1/\sqrt{2}, 1/\sqrt{2})$, and the signal point of a reference signal subject to first spreading by ZAC #2, ZAC #6 or ZAC #10 is $(1/\sqrt{2}, -1/\sqrt{2})$.

Thus, by scrambling processing in scrambling section 214, the present embodiment inverts the constellation of a reference signal for the second response signal group with respect to the constellation of a reference signal for the first response signal group.

Thus, by performing inversion processing of the constellation of a reference signal in scrambling section 214, it is equally possible to achieve the same effect as in Embodiment 1.

Embodiment 6

Figure 15:
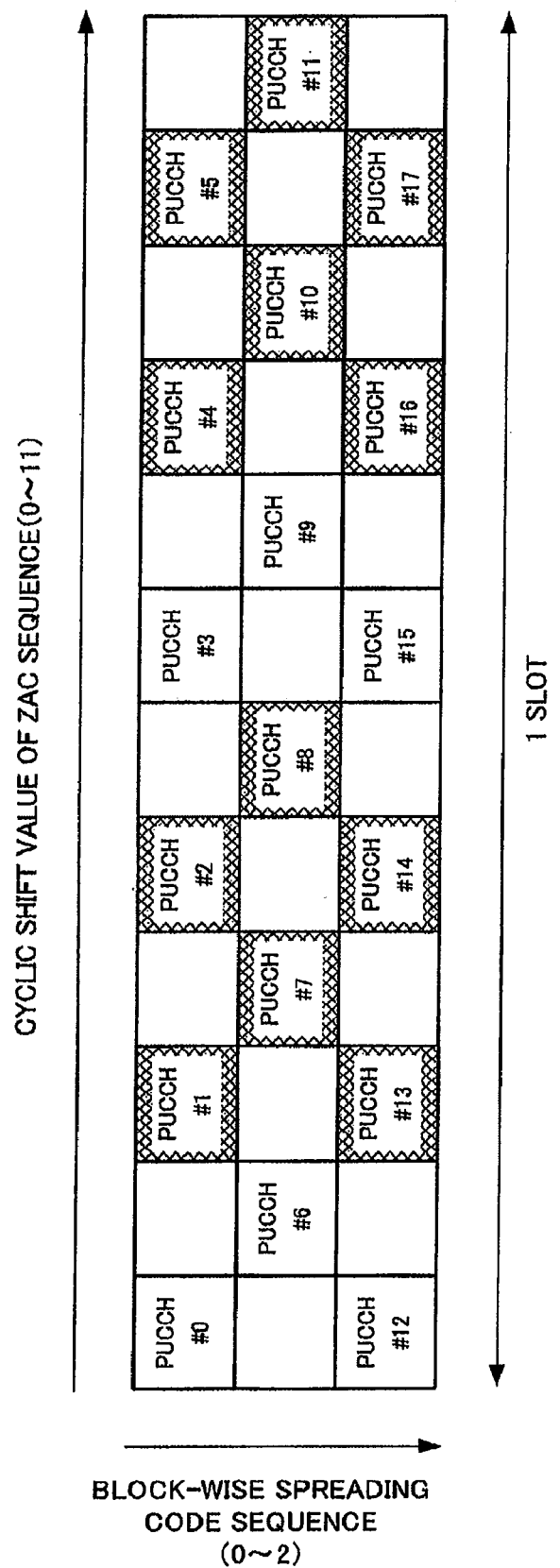
FIG. 15 is a diagram showing a constellation change according to Embodiment 6 of the present invention.

If there is a large difference of received power between response signals from a plurality of mobile stations at a base station, response signals of higher received power may interfere with response signals of lower received power. For example, in response signals subject to second spreading using BW #0 shown in FIG. 15, when the received power of a response signal that is transmitted using PUCCH #0 and the received power of a response signal that is transmitted using PUCCH #3 are higher, and the received power of response signals that are transmitted using the other PUCCH's is lower, the response signal that is transmitted using PUCCH #0 and the response signal that is transmitted using PUCCH #3 give the largest interference to response signals that are transmitted using the other PUCCH's.

Therefore, in this case, in ZAC #0, ZAC #2, ZAC #4, ZAC #6, ZAC #8 and ZAC #10 that are used in first spreading of response signals subject to second spreading using BW #0, the response signals subject to first spreading by ZAC #0 and ZAC #6 form the first response signal group, and the response signals subject to first spreading by ZAC #2, ZAC #4, ZAC #8 and ZAC #10 form the second response signal group. Then, while the constellation of the first response signal group is constellation #1 (in FIG. 3 and FIG. 4), the constellation of the second response signal group is constellation #2 (in FIG. 8 and FIG. 9). That is, the present embodiment inverts the constellation of the second response signal group of lower received power with respect to the constellation of the first response signal group of higher received power.

Thus, according to the present embodiment, by inverting the constellation of a signal of lower received power with respect to the constellation of a response signal of higher received power on the cyclic shift axis, it is possible to prevent an increased NACK error rate by inter-code interference from an ACK due to the received power difference, and, as in Embodiment 1, improve the error rate performance of a NACK compared to the prior art.

Embodiments of the present invention have been described above.

Also, a PUCCH used in the above-described embodiments is a channel to feed back an ACK or NACK, and therefore may be referred to as an "ACK/NACK channel."

Also, it is possible to implement the present invention as described above, even when other control information than a response signal is fed back.

Also, a mobile station may be referred to as a "UE," "MT," "MS" and "STA (station)." Also, a base station may be referred to as a "node B, "BS" or "AP." Also, a subcarrier may be referred to as a "tone." Also, a CP may be referred to as a "GI (Guard Interval)."

Also, the method of error detection is not limited to CRC check.

Also, a method of performing transformation between the frequency domain and the time domain is not limited to IFFT and FFT.

Also, a case has been described with the above-described embodiments where the present invention is applied to mobile stations. Here, the present invention is also applicable to a fixed radio communication terminal apparatus in a stationary state and a radio communication relay station apparatus that performs the same operations with a base station as a mobile station. That is, the present invention is applicable to all radio communication apparatuses.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI, or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-280795, filed on Oct. 29, 2007, including the specification, drawings and abstract, is incorporated herein by reference in its entirety.

INDUSTRIAL APPLICABILITY

The present invention is applicable to, for example, mobile communication systems.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. A base station for receiving an acknowledgement or negative acknowledgement (ACK/NACK) signal, comprising:
   a transmitting unit configured to transmit a control signal using one or a plurality of Control Channel Elements (CCE(s)); and
   a receiving unit configured to receive an ACK/NACK signal, the ACK/NACK signal being multiplied by an orthogonal sequence, by a sequence defined by a cyclic shift, and by either a first value or a second value, wherein the first value rotates a constellation of the ACK/NACK signal by 0 degrees and the second value rotates the constellation of the ACK/NACK signal by N degrees, which is different from 0 degrees on an axis of rotation, and wherein the orthogonal sequence has a sequence index corresponding to a Physical Uplink Control Channel (PUCCH) index associated with a first CCE number of said one or a plurality of CCE(s) and the cyclic shift corresponds to the PUCCH index;
   wherein, in a case where said PUCCH index is in a first PUCCH index group, the ACK/NACK signal is multiplied by the same one of the first value or the second value for both communication in a first slot and communication in a second slot, and in a case where said PUCCH index is in a second PUCCH index group, the ACK/NACK signal is multiplied by different ones of the first value and the second value, respectively, for communication in the first slot and communication in the second slot.

2. The base station according to claim 1, wherein all PUCCH indexes available in a subframe are included in either the first PUCCH index group or the second PUCCH index group, wherein the subframe consists of the first slot and the second slot.

3. The base station according to claim 1, wherein PUCCH indexes available in a subframe include at least one PUCCH index included in the first PUCCH index group and at least one PUCCH index included in the second PUCCH index group, wherein the subframe consists of the first slot and the second slot.

4. A receiving method for a base station to receive an acknowledgement or negative acknowledgement (ACK/NACK) signal, the method comprising:
   transmitting a control signal using one or a plurality of Control Channel Elements (CCE(s)); and
   receiving an ACK/NACK signal, the ACK/NACK signal being multiplied by an orthogonal sequence, by a sequence defined by a cyclic shift, and by either a first value or a second value, wherein the first value rotates a constellation of the ACK/NACK signal by 0 degrees and the second value rotates the constellation of the ACK/NACK signal by N degrees, which is different from 0 degrees on an axis of rotation, and wherein the orthogonal sequence has a sequence index corresponding to a Physical Uplink Control Channel (PUCCH) index associated with a first CCE number of said one or a plurality of CCE(s) and the cyclic shift corresponds to the PUCCH index;
   wherein, in a case where said PUCCH index is in a first PUCCH index group, the ACK/NACK signal is multiplied by the same one of the first value or the second value for both communication in a first slot and communication in a second slot, and in a case where said PUCCH index is in a second PUCCH index group, the ACK/NACK signal is multiplied by different ones of the first value and the second value, respectively, for communication in the first slot and communication in the second slot.

5. The receiving method according to claim 4, wherein all PUCCH indexes available in a subframe are included in either the first PUCCH index group or the second PUCCH index group, wherein the subframe consists of the first slot and the second slot.

6. The receiving method according to claim 4, wherein PUCCH indexes available in a subframe include at least one PUCCH index included in the first PUCCH index group and at least one PUCCH index included in the second PUCCH index group, wherein the subframe consists of the first slot and the second slot.

* * * * *

UNITED STATES PATENT AND TRADEMARK OFFICE
CERTIFICATE OF CORRECTION

PATENT NO. : 8,369,382 B2
APPLICATION NO. : 13/525109
DATED : February 5, 2013
INVENTOR(S) : Seigo Nakao et al.

It is certified that error appears in the above-identified patent and that said Letters Patent is hereby corrected as shown below:

In the Specifications:

Column 20, Line 22:
"Control Channel Elements (CCE(s); and" should read, --Control Channel Elements (CCE(s)); and--.

Signed and Sealed this
Sixteenth Day of April, 2013

Teresa Stanek Rea
*Acting Director of the United States Patent and Trademark Office*